(12) United States Patent
Xu et al.

(10) Patent No.: US 10,136,445 B2
(45) Date of Patent: Nov. 20, 2018

(54) FEEDBACK METHOD AND DEVICE

(71) Applicant: ZTE Corporation, Shenzhen (CN)

(72) Inventors: Jin Xu, Shenzhen (CN); Jun Xu, Shenzhen (CN); Bo Dai, Shenzhen (CN)

(73) Assignee: SHANGHAI ZHONGXING SOFTWARE COMPANY LIMITED, Shanghai (CN)

( * ) Notice: Subject to any disclaimer, the term of this patent is extended or adjusted under 35 U.S.C. 154(b) by 0 days.

(21) Appl. No.: 15/513,417

(22) PCT Filed: Apr. 3, 2015

(86) PCT No.: PCT/CN2015/075891
§ 371 (c)(1),
(2) Date: Mar. 22, 2017

(87) PCT Pub. No.: WO2015/184919
PCT Pub. Date: Dec. 10, 2015

(65) Prior Publication Data
US 2017/0303284 A1    Oct. 19, 2017

(30) Foreign Application Priority Data

Sep. 24, 2014  (CN) .......................... 2014 1 0495662

(51) Int. Cl.
| | |
|---|---|
| *H04L 1/18* | (2006.01) |
| *G08C 25/02* | (2006.01) |
| *H04W 72/08* | (2009.01) |
| *H04L 5/00* | (2006.01) |
| *H04W 28/04* | (2009.01) |

(Continued)

(52) U.S. Cl.
CPC ......... *H04W 72/082* (2013.01); *H04L 1/0026* (2013.01); *H04L 1/0081* (2013.01);
(Continued)

(58) Field of Classification Search
CPC .. H04W 72/082; H04W 28/04; H04L 5/0055; H04L 5/0064; H04L 1/1816
See application file for complete search history.

(56) References Cited

U.S. PATENT DOCUMENTS

| | | | |
|---|---|---|---|
| 2003/0123409 A1 | 7/2003 | Kwak | |
| 2011/0246840 A1* | 10/2011 | Khoshnevis | H04L 1/0073 714/712 |

(Continued)

FOREIGN PATENT DOCUMENTS

| | | |
|---|---|---|
| CN | 1983913 A | 6/2007 |
| CN | 103312719 A | 9/2013 |

(Continued)

OTHER PUBLICATIONS

International Search Report for corresponding application PCT/CN2015/075891 filed on Apr. 3, 2015; dated Jul. 9, 2015.

(Continued)

*Primary Examiner* — Sam Rizk
(74) *Attorney, Agent, or Firm* — Cantor Colburn LLP

(57) ABSTRACT

The method includes that: a first transmission node receives a signal including a Transmission Block (TB) from a second transmission node; the first transmission node obtains states of the P CB sets according to the signal including the TB; the first transmission node determines at least one kind of feedback information in a preset feedback information set according to the states of the P CB sets; and the first transmission node sends the determined feedback information to the second transmission node.

20 Claims, 4 Drawing Sheets

(51) Int. Cl.
  *H04L 1/00* (2006.01)
  *H04L 1/16* (2006.01)
(52) U.S. Cl.
  CPC .......... *H04L 1/1607* (2013.01); *H04L 1/1621* (2013.01); *H04L 1/1692* (2013.01); *H04L 1/1816* (2013.01); *H04L 5/0055* (2013.01); *H04L 5/0064* (2013.01); *H04W 28/04* (2013.01); *H04L 1/0057* (2013.01)

(56) References Cited

U.S. PATENT DOCUMENTS

| | | | |
|---|---|---|---|
| 2013/0195055 A1 | 8/2013 | Zhang et al. | |
| 2013/0301586 A1* | 11/2013 | Fan | H04L 1/0073 370/329 |

FOREIGN PATENT DOCUMENTS

| | | |
|---|---|---|
| EP | 2413627 A1 | 2/2012 |
| EP | 2663007 A1 | 11/2013 |

OTHER PUBLICATIONS

Extended European Search Report dated Jan. 5, 2018 re: Application No. 15803123.7-1875 / 3200376 PCT/CN2015/075891; pp. 1-22; citing: EP 2 413 627 A1, Motorola "Number of HARQ . . . ", US 2013/195055 A1, EP 2 663 007 A1.

Motorola: "Number of HARQ Channels", 3GPP Draft; R1-062597 #HARQ Channels, 3rd Generation Partnership Project (3GPP), Mobile Competence Centre; Oct. 4, 2006; vol. RAN WG1, No. Seoul, Korea, XP050596158.

* cited by examiner

FEEDBACK METHOD AND DEVICE

TECHNICAL FIELD

The disclosure relates to the technical field of information feedback, and in particular to a feedback method and device.

BACKGROUND

In a Long-Term Evolution (LTE) system in the related art, a physical-layer data shared channel performs data transmission by taking a Transmission Block (TB) as a basic element. A receiver determines whether or not a current TB is correctly received through a Cyclic Redundancy Check (CRC) of the TB. When the TB is correctly received, the receiver feeds back an Acknowledgement (ACK) message to a sender. When the TB is not correctly received, the receiver feeds back a Negative Acknowledgement (NACK) message to the sender. The sender retransmits data to the receiver after receiving the NACK message, and retransmission is still performed by taking the TB as the element.

When a size of the TB exceeds a specified threshold, the sender is usually required to perform Code Block (CB) segmentation to segment the TB into multiple CBs, and operations of coding, rate matching, CB concatenation and the like are respectively performed on each CB for sending to the receiver.

A CRC is added to each CB before coding, and in addition, each TB also has another CRC. In the LTE system, lengths of the two CRCs are both 24 bit. A CB CRC is used for premature termination of decoding and the CB CRC may also check correctness of a CB. When the CB CRC succeeds in checking, it is indicated that the CB is a correct CB, and when the CB CRC fails in checking, it is indicated that the CB is an incorrect CB.

The TB CRC is used for correctness checking of a received TB. When the TB CRC fails in checking at the receiver, it is indicated that the TB is incorrectly received, and the TB is required to be retransmitted. When a TB includes a relatively larger number of CBs, relatively more resources are occupied by retransmission. For example, as shown in FIG. 1, a TB includes 8 CBs, and only CB2 and CB5 are incorrectly decoded during first transmission. However, during retransmission, the other CBs without errors are also required to be retransmitted. This is because an ACK or NACK of the LTE system in the related art is fed back on a basis of a TB, there is no CB-based A or N feedback and CB-based feedback may cause extremely high uplink A or N feedback overhead.

Packet coding is a technology for coding between data packets, i.e. a process of coding multiple source data packets to generate check data packets. As shown in FIG. 2, a process of generating a check sequence at a position in a check data packet from an information sequence at a position in a source data packet corresponding to the position in the check data packet is packet coding. Each check data packet includes data at a corresponding position in each check sequence. There may be various packet coding methods. For example, check data packets may be generated in a manner of performing an exclusive OR operation on each source data packet, the check data packets may also be generated in a Reed-Solomon coding manner, and the check data packets may further be generated in a fountain code or network coding manner.

In a digital mobile communication system, a coding bit sequence obtained by rate matching is required to be modulated into a digital baseband signal for transmission. In the LTE system, common modulation constellation diagrams include Binary Phase Shift Keying (BPSK), Quadrature Phase Shift Keying (QPSK), 16 Quadrature Amplitude Modulation (16QAM), 64 Quadrature Amplitude Modulation (64QAM) and the like. All of these modulation constellation diagrams include some limited discrete constellation points used for representing amplitudes and phases of digital baseband signals, and geographical distances between the constellation points are called as Euclidean distances. When the Euclidean distances between adjacent constellation points are equal and each constellation point is uniformly distributed in a constellation diagram, the modulation constellation diagram is called as a uniform constellation diagram. For example, the modulation constellation diagrams such as QPSK, 16QAM and 64QAM adopted in the LTE system are all uniform constellation diagrams. On the contrary, when Euclidean distances between adjacent constellation points are unequal or each constellation point is nonuniformly distributed in a constellation diagram, the constellation diagram is called as a nonuniform constellation diagram.

SUMMARY

The embodiments of the disclosure are intended to solve a technical problem of how to effectively reduce a retransmitted data volume and improve data retransmission efficiency during CB-based transmission.

To this end, the technical solutions are implemented as follows.

A feedback method may be applied to a first transmission node, and the method may include that:

receiving, by the first transmission node, a signal including a Transmission Block (TB) from a second transmission node, wherein the TB includes K Code Blocks (CBs) and the K CBs are divided into P CB sets, K and P are positive integers, $K \geq 3$ and $2 \leq P \leq K$; obtaining, by the first transmission node, states of the P CB sets according to the signal including the TB; determining, by the first transmission node, at least one kind of feedback information in a preset feedback information set according to the states of the P CB sets, wherein the feedback information set at least includes: correctness indication information and n kinds of incorrectness indication information, n is an integer more than or equal to 1; and sending, by the first transmission node, the determined feedback information to the second transmission node.

In an example embodiment, each CB set in the P CB sets includes at least one CB in the TB.

In an example embodiment, each CB set in the P CB sets is determined according to at least one preset CB set division manner and a number P of CB sets; the preset CB set division manner at least includes a continuous division manner or a discontinuous division manner, wherein the continuous division manner refers to that at least two CBs at adjacent positions in the TB are divided into the same CB set; and the discontinuous division manner refers to that CBs at any two adjacent positions in the TB may not be divided into the same CB set in the P CB sets.

In an example embodiment, the number P of the CB sets is one of m preset positive integers, and is determined by the first transmission node and sent from the first transmission node to the second transmission node, and $m \geq 1$.

In an example embodiment, a number P of CB sets is determined according to a size of the TB.

In an example embodiment, obtaining, by the first transmission node, the states of the P CB sets according to the signal including the TB includes: determining, by the first transmission node, the states of the P CB sets according to at least one of the following parameters: a number of incorrect or correct CB sets in the P CB sets, an incorrectness rate or correctness rate of CB sets, CB error patterns of incorrect CB sets in the P CB sets and a CB error pattern of the TB; the correct CB sets refers to that each of the CB sets include correct CBs; the incorrect CB sets refer to that each of CB sets includes at least one incorrect CB; the incorrectness rate or correctness rate of the CB sets refers to dividing a number of incorrect or correct CB sets in the P CB sets by P; the CB error patterns of the incorrect CB sets refer to positions or indexes of incorrect or correct CBs in the incorrect CB sets; and the CB error pattern of the TB refers to positions or indexes of incorrect or correct CBs in the TB.

In an example embodiment, when the feedback information set includes correctness indication information Acknowledgement (ACK) and one kind of incorrectness indication information Negative Acknowledgement (NACK), the correctness indication information ACK is used for indicating that the first transmission node correctly receives the TB; and the incorrectness indication information NACK is used for indicating that the first transmission node does not correctly receive the TB.

In an example embodiment, when the feedback information set at least includes the correctness indication information ACK and two kinds of incorrectness indication information $NACK_1$ and $NACK_2$, the correctness indication information ACK is used for indicating that the first transmission node correctly receives the TB; the incorrectness indication information $NACK_1$ is used for indicating that retransmitted data at least includes part of data obtained by packet coding on M CB sets in the P CB sets, wherein M is a positive integer and $2 \leq M \leq P$; and the incorrectness indication information $NACK_2$ is used for indicating that the retransmitted data should at least include part of data of the TB.

In an example embodiment, after sending, by the first transmission node, the determined feedback information to the second transmission node, further including: performing, by the second transmission node, packet coding on the M CB sets in the P CB sets to obtain S check CB sets, wherein a length of each check CB set in the S check CB sets is T bits, M, S and T are all positive integers and $2 \leq M \leq P$; and the retransmitted data at least includes Q bits in each check CB set, wherein Q is a positive integer and $1 \leq Q \leq T$.

In an example embodiment, performing, by the second transmission node, the packet coding on the M CB sets in the P CB sets to obtain the S check CB sets includes: coding bits or symbols at the same index position of each CB set in the M CB sets to generate the S check CB sets.

In an example embodiment, sending, by the first transmission node, the determined feedback information to the second transmission node includes: when the feedback information set at least includes the incorrectness indication information ACK and the two kinds of incorrectness indication information $NACK_1$ and $NACK_2$, modulating the ACK, the $NACK_1$ and the $NACK_2$ by adopting a nonuniform constellation diagram.

In an example embodiment, modulating the ACK, the $NACK_1$ and the $NACK_2$ by adopting the nonuniform constellation diagram includes: on the modulation constellation diagram, determining that a Euclidean distance between the ACK and the $NACK_1$ is longer than a Euclidean distance between the $ACK_1$ and the $NACK_2$ and a Euclidean distance between the ACK and the $NACK_2$ is also longer than the Euclidean distance between the $ACK_1$ and the $NACK_2$.

In an example embodiment, the feedback information set further includes a number P of CB sets; and the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$; or, after the K CBs are divided into the P CB sets, a maximum of a number of incorrect CBs at the same index positions is minimum in division solutions when P adopts different values.

In an example embodiment, the feedback information set further includes at least one CB set division manner.

In an example embodiment, the feedback information set further includes a number Z of correct or incorrect CB sets, wherein Z is a positive integer and $1 \leq Z \leq P$.

In an example embodiment, the feedback information set further includes CB error patterns of incorrect CB sets, or a CB error pattern of the TB.

In an example embodiment, determining, by the first transmission node, the at least one kind of feedback information in the preset feedback information set according to the states of the P CB sets includes: when the P CB sets are all correct CB sets, determining, by the first transmission node, correctness indication information ACK in the preset feedback information set as feedback information, and when at least one CB set in the P CB sets is an incorrect CB set and the feedback information set includes one kind of incorrectness indication information NACK, determining, by the first transmission node, the incorrectness indication information NACK in the preset feedback information set as the feedback information.

In an example embodiment, determining, by the first transmission node, the at least one kind of feedback information in the preset feedback information set according to the states of the P CB sets includes: when the feedback information set at least includes incorrectness indication information $NACK_1$ and $NACK_2$, determining, by the first transmission node, the incorrectness indication information in the preset feedback information set as feedback information according to a number of incorrect or correct CB sets in the P CB sets or according to incorrectness rate or correctness rate of the CB sets.

In an example embodiment, determining, by the first transmission node, the incorrectness indication information sent to the second transmission node according to the number of the incorrect or correct CB sets in the P CB sets or according to the incorrectness rate or correctness rate of the CB sets includes: when the number of the incorrect CB sets or the incorrectness rate of the CB sets does not exceed a second preset threshold value, or when the number of the correct CB sets or the correctness rate of the CB sets exceeds a third preset threshold value, determining, by the first transmission node, the incorrectness indication information $NACK_1$ in the preset feedback information set as the feedback information; and when the number of the incorrect CB sets or the incorrectness rate of the CB sets exceeds the second preset threshold value, or when the number of the correct CB sets or the correctness rate of the CB sets does not exceed the third preset threshold value, determining, by the first transmission node, the incorrectness indication information $NACK_2$ in the preset feedback information set as the feedback information.

In an example embodiment, determining, by the first transmission node, the at least one kind of feedback information in the preset feedback information set according to the states of the P CB sets includes: when the feedback information set at least includes incorrectness indication information $NACK_1$ and $NACK_2$, determining, by the first transmission node, the incorrectness indication information in the preset feedback information set as the feedback information according to CB error patterns of incorrect CB sets.

In an example embodiment, determining, by the first transmission node, the incorrectness indication information sent to the second transmission node according to CB error patterns of incorrect CB sets includes: when a number of the incorrect CBs at the same index positions in the incorrect CB sets does not exceed a fourth preset threshold value, sending, by the first transmission node, first incorrectness indication information $NACK_1$ to the second transmission node; and when the number of the incorrect CBs at the same index positions in the incorrect CB sets exceeds the fourth preset threshold value, sending, by the first transmission node, second incorrectness indication information $NACK_2$ to the second transmission node.

A feedback device may be arranged in a first transmission node, including: a receiving component, a state determination component, a feedback information determination component and a sending component, wherein the receiving component is arranged to receive a signal including a Transmission Block (TB) from a second transmission node, wherein the TB includes K Code Blocks (CBs) and the K CBs are divided into P CB sets, K and P are positive integers, $K \geq 3$ and $2 \leq P \leq K$; the state determination component is arranged to obtain states of the P CB sets according to the signal including the TB; the feedback information determination component is arranged to determine at least one kind of feedback information in a preset feedback information set according to the states of the P CB sets, wherein the feedback information set at least includes correctness indication information and n kinds of incorrectness indication information, n is an integer more than or equal to 1; and the sending component is arranged to send the determined feedback information to the second transmission node.

In an example embodiment, each CB set in the P CB sets includes at least one CB in the TB.

In an example embodiment, each CB set in the P CB sets is determined according to at least one preset CB set division manner and a number P of CB sets; the preset CB set division manner at least includes a continuous division manner or a discontinuous division manner, wherein the continuous division manner refers to that at least two CBs at adjacent positions in the TB are divided into the same CB set; and the discontinuous division manner refers to that CBs at any two adjacent positions in the TB may not be divided into the same CB set in the P CB sets.

In an example embodiment, the number P of the CB sets is one of m preset positive integers, and is determined by the first transmission node and sent from the first transmission node to the second transmission node, and $m \geq 1$.

In an example embodiment, a number P of CB sets is determined according to a size of the TB.

In an example embodiment, the state determination component is arranged to obtain the states of the P CB sets according to the signal including the TB according to the following manner: the state determination component is arranged to determine the states of the P CB sets according to at least one of the following parameters: a number of incorrect or correct CB sets in the P CB sets, an incorrectness rate or correctness rate of CB sets, CB error patterns of incorrect CB sets in the P CB sets and a CB error pattern of the TB; the correct CB sets refer to that each of the CB sets include correct CBs; the incorrect CB sets refer to that each of CB sets includes at least one incorrect CB; the incorrectness rate or correctness rate of the CB sets refers to dividing a number of incorrect or correct CB sets in the P CB sets by P; the CB error patterns of the incorrect CB sets refer to positions or indexes of incorrect or correct CBs in the incorrect CB sets; and the CB error pattern of the TB refers to positions or indexes of incorrect or correct CBs in the TB.

In an example embodiment, when the feedback information set includes correctness indication information Acknowledgement (ACK) and one kind of incorrectness indication information Negative Acknowledgement (NACK), the correctness indication information ACK is used for indicating that the first transmission node correctly receives the TB; and the incorrectness indication information NACK is used for indicating that the first transmission node does not correctly receive the TB.

In an example embodiment, when the feedback information set at least includes the correctness indication information ACK and two kinds of incorrectness indication information $NACK_1$ and $NACK_2$, the correctness indication information ACK is used for indicating that the first transmission node correctly receives the TB; the incorrectness indication information $NACK_1$ is used for indicating that retransmitted data at least includes part of data obtained by packet coding on M CB sets in the P CB sets, wherein M is a positive integer and $2 \leq M \leq P$; and the incorrectness indication information $NACK_2$ is used for indicating that the retransmitted data should at least include part of data of the TB.

In an example embodiment, when the feedback information set at least includes the incorrectness indication information ACK and the two kinds of incorrectness indication information $NACK_1$ and $NACK_2$, the ACK, the $NACK_1$ and the $NACK_2$ are modulated by adopting a nonuniform constellation diagram.

In an example embodiment, an operation that the ACK, the $NACK_1$ and the $NACK_2$ are modulated by adopting the nonuniform constellation diagram refers to that: on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

In an example embodiment, the feedback information set further includes a number P of CB sets; and the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$; or, after the K CBs are divided into the P CB sets, a maximum of a number of incorrect CBs at the same index positions is minimum in division solutions when P adopts different values.

In an example embodiment, the feedback information set further includes at least one CB set division manner.

In an example embodiment, the feedback information set further includes a number Z of correct or incorrect CB sets, wherein Z is a positive integer and $1 \leq Z \leq P$.

In an example embodiment, the feedback information set further includes CB error patterns of incorrect CB sets, or a CB error pattern of the TB.

In an example embodiment, the feedback information determination component is arranged to determine the at least one kind of feedback information in the preset feedback information set according to the states of the P CB sets according to the following manner: when the P CB sets are all correct CB sets, the feedback information determination component determines correctness indication information ACK in the preset feedback information set as feedback information, and when at least one CB set in the P CB sets is an incorrect CB set and the feedback information set includes one kind of incorrectness indication information NACK, the feedback information determination component determines the incorrectness indication information NACK in the preset feedback information set as the feedback information.

In an example embodiment, the feedback information determination component is arranged to determine the at least one kind of feedback information in the preset feedback information set according to the states of the P CB sets according to the following manner: when the feedback information set at least includes the incorrectness indication information $NACK_1$ and $NACK_2$, the feedback information determination component determines the incorrectness indication information in the preset feedback information set as the feedback information according to a number of incorrect or correct CB sets in the P CB sets or according to incorrectness rate or correctness rate of the CB sets.

In an example embodiment, the feedback information determination component is arranged to determine the incorrectness indication information determined as the feedback information in the preset feedback information set according to the number of the incorrect or correct CB sets in the P CB sets or according to the incorrectness rate or correctness rate of the CB sets according to the following manner: when the number of the incorrect CB sets or the incorrectness rate of the CB sets does not exceed a second preset threshold value, or when the number of the correct CB sets or the correctness rate of the CB sets exceeds a third preset threshold value, the feedback information determination component determines the incorrectness indication information $NACK_1$ in the preset feedback information set as the feedback information; and when the number of the incorrect CB sets or the incorrectness rate of the CB sets exceeds the second preset threshold value, or when the number of the correct CB sets or the correctness rate of the CB sets does not exceed the third preset threshold value, the feedback information determination component determines the incorrectness indication information $NACK_2$ in the preset feedback information set as the feedback information.

In an example embodiment, the feedback information determination component is arranged to determine the at least one kind of feedback information in the preset feedback information set according to the states of the P CB sets according to the following manner: when the feedback information set at least includes incorrectness indication information $NACK_1$ and $NACK_2$, the feedback information determination component determines the incorrectness indication information in the preset feedback information set as the feedback information according to CB error patterns of incorrect CB sets.

In an example embodiment, the feedback information determination component is arranged to determine the incorrectness indication information in the preset feedback information set as the feedback information according to the CB error patterns of the incorrect CB sets according to the following manner: when a number of the incorrect CBs at the same index positions in the incorrect CB sets does not exceed a fourth preset threshold value, the feedback information determination component determines first incorrectness indication information $NACK_1$ in the preset feedback information set as the feedback information; and when the number of the incorrect CBs at the same index positions in the incorrect CB sets exceeds the fourth preset threshold value, the feedback information determination component determines second incorrectness indication information $NACK_2$ in the preset feedback information set as the feedback information.

The disclosure discloses a feedback solution, which may effectively reduce a retransmitted data volume and improve data retransmission efficiency. Specifically, a relatively larger TB is divided into multiple CB sets with equal sizes, each CB set consists of multiple CBs, and a receiver may perform feedback according to receiving conditions of these CB sets; and feedback information may be used for indicating a receiving state of the CB sets and simultaneously provide an important reference basis for whether or not a sender may perform data retransmission by adopting a packet coding manner.

DETAILED DESCRIPTION

Figure 1:
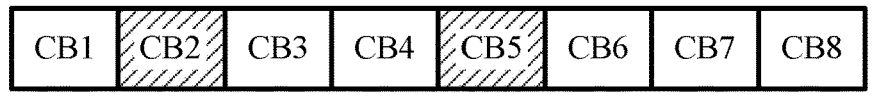
FIG. 1 is a schematic diagram of a receiving condition of each CB in a TB.
Figure 2:
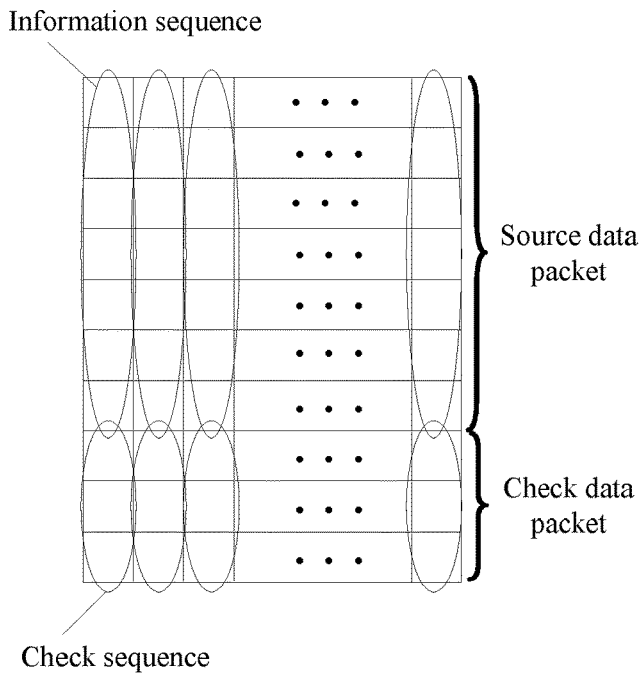
FIG. 2 is a schematic diagram of packet coding.

The technical solutions of the disclosure will be described below with reference to the drawings and embodiments in more detail.

It is important to note that embodiments of the disclosure and each characteristic in the embodiments may be combined without conflicts, and these combinations all fall within the scope of protection of the disclosure. In addition, although logical sequences are shown in the flowcharts, the shown or described steps may be executed in sequences different from the sequences shown here under some conditions.

A feedback method is applied to a first transmission node, and the method includes that:

the first transmission node receives a signal including a TB from a second transmission node, in which the TB includes K CBs and the K CBs are divided into P CB sets, K and P are positive integers, K≥3 and 2≤P≤K;

the first transmission node obtains states of the P CB sets according to the signal including the TB; and the first transmission node determines at least one kind of feedback information in a preset feedback information set according to the states of the P CB sets, and sends the determined feedback information to the second transmission node, in which the feedback information set at least includes: correctness indication information (ACK) and n kinds of incorrectness indication information (NACK$_1$, NACK$_2$, ..., NACK$_n$), in which n is an integer more than or equal to 1.

Alternatively, the first transmission node may be, but not limited to: any network element with data receiving and signaling sending functions such as a terminal, an evolved Node B and a relay.

Alternatively, the second transmission node may be, but not limited to: any network element with a signaling receiving function such as a terminal, an evolved Node B and a relay.

Alternatively, each CB set in the P CB sets includes at least one CB in the TB.

Alternatively, each CB set in the P CB sets may be determined according to at least one preset CB set division manner and a number P of CB sets.

Furthermore, the preset CB set division manner at least includes a continuous division manner or a discontinuous division manner.

Furthermore, the continuous division manner refers to that at least two CBs at adjacent positions in the TB are divided into the same CB set.

Furthermore, the discontinuous division manner refers to that CBs at any two adjacent positions in the TB may not be divided into the same CB set in the P CB sets.

Alternatively, the number P of the CB sets may be configured by the evolved Node B.

Furthermore, the number P of the CB sets is one of m preset positive integers, and is determined by the first transmission node and sent from the first transmission node to the second transmission node, and m≥1.

Alternatively, the number P of the CB sets may be autonomously determined by the first transmission node and sent from the first transmission node to the second transmission node.

Alternatively, the number P of the CB sets may also be determined according to a size of the TB.

Furthermore, specifically, the size of the TB is divided into multiple value intervals according to a sequence from small to large, and each value interval corresponds to the number P of the CB sets; and the number of the CB sets is determined according to a value interval of the size of the TB.

Alternatively, a number of CBs in each CB set may be determined according to the following method:

when K may be exactly divided by P, each CB set includes K/P CBs; and when K may not be exactly divided by P, each CB set in $P_1=K-P \cdot \lfloor K/P \rfloor$ CB sets includes $\lceil K/P \rceil$ CBs, and each CB set in $P_2=P \cdot \lceil K/P \rceil - K$ CB sets includes $\lfloor K/P \rfloor$ original CBs and a filling CB, in which operators $\lceil x \rceil$ and $\lfloor x \rfloor$ respectively represent a rounding-up or rounding-down operation over x, and $P_1+P_2=R$.

Furthermore, a filling CB may be formed by any preset data, including, but not limited to: a CB formed by an all-1 bit sequence or an all-0 bit sequence, or any CB in the CB set.

Alternatively, the step that the first transmission node obtains the states of the P CB sets according to the signal including the TB includes that:

the first transmission node determines the states of the P CB sets according to at least one of the following parameters:

a number of incorrect (or correct) CB sets in the P CB sets, an incorrectness rate (or correctness rate) of the CB sets, CB error patterns of the incorrect CB sets in the P CB sets and a CB error pattern of the TB.

Furthermore, the correct CB sets refer to that each of the CB sets includes correct CBs.

Furthermore, the incorrect CB sets refer to that each of the CB sets includes at least one incorrect CB.

Furthermore, the incorrectness rate (or correctness rate) of the CB sets refers to dividing the number of the incorrect (or correct) CB sets in the P CB sets by P.

Furthermore, the CB error patterns of the incorrect CB sets refer to positions (indexes) of incorrect (or correct) CBs in the incorrect CB sets.

Furthermore, the CB error pattern of the TB refers to positions (indexes) of incorrect (or correct) CBs in the TB.

Alternatively, when the feedback information set includes correctness indication information ACK and one kind of incorrectness indication information NACK, the correctness indication information ACK is used for indicating that the first transmission node correctly receives the TB.

Alternatively, when the feedback information set includes the correctness indication information ACK and the unique incorrectness indication information NACK, the unique incorrectness indication information NACK is used for indicating that the first transmission node does not correctly receive the TB.

Alternatively, when the feedback information set includes the correctness indication information ACK and the one kind of the incorrectness indication information NACK, the ACK is represented by a bit "0" and the NACK is represented by a bit "1"; or, the ACK is represented by the bit "1" and the "NACK" is represented by the bit "0".

Alternatively, when the feedback information set at least includes the correctness indication information ACK and two kinds of incorrectness indication information NACK$_1$ and NACK$_2$, the correctness indication information ACK is used for indicating that the first transmission node correctly receives the TB.

Alternatively, when the feedback information set at least includes the correctness indication information ACK and the two kinds of incorrectness indication information NACK$_1$ and NACK$_2$, the incorrectness indication information NACK$_1$ is used for indicating that retransmitted data at least includes part of data obtained by packet coding on M CB sets in the P CB sets, in which M is a positive integer and 2≤M≤P.

Furthermore, that the retransmitted data at least includes part of data obtained by packet coding on the M CB sets in the P CB sets refers to that:

the second transmission node performs packet coding on the M CB sets in the P CB sets to obtain S check CB sets, in which a length of each check CB set in the S check CB sets is T bits, M, S and T are all positive integers and 2≤M≤P; and the retransmitted data at least includes Q bits in each check CB set, in which Q is a positive integer and 1≤Q≤T.

Furthermore, packet coding refers to that bits or symbols at the same index position of each CB set in the M CB sets are coded to generate the S check CB sets.

Furthermore, a coding operation may be, but not limited to, one of the following manners: bit exclusive or (or called as modular two addition) coding, Reed-Solomon coding, Bose, Ray-Chaudhuri and Hocquenghem (BCH) coding, linear coding such as digital fountain coding, symbol superimposition coding, network coding and the like.

Alternatively, when the feedback information set at least includes the correctness indication information ACK and the two kinds of incorrectness indication information $NACK_1$ and $NACK_2$, the incorrectness indication information $NACK_2$ is used for indicating that the retransmitted data should at least include part of data of the TB.

Alternatively, when the feedback information set at least includes the incorrectness indication information ACK and the two kinds of incorrectness indication information $NACK_1$ and $NACK_2$, the ACK, the $NACK_1$ and the $NACK_2$ are respectively represented by any two bits.

Alternatively, when the feedback information set at least includes the incorrectness indication information ACK and the two kinds of incorrectness indication information $NACK_1$ and $NACK_2$, the ACK, the $NACK_1$ and the $NACK_2$ are modulated by adopting a nonuniform constellation diagram. That is, on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

Alternatively, the feedback information set further includes the number P of the CB sets.

Furthermore, the number P of the CB sets meets one of the following conditions: after the K CBs are divided into the P CB sets, a maximum of a number of incorrect CBs at the same index positions does not exceed a first preset threshold value G, in which G is a positive integer and $1 \leq G \leq P$;

or, the number P of the CB sets meets that: after the K CBs are divided into the P sets, the maximum of the number of the incorrect CBs at the same index positions is minimum in division solutions when P adopts different values. For example, when P is 2, after division, the maximum of the number of the incorrect CBs at the same index positions is x2; when P is 3, after division, the maximum of the number of the incorrect CBs at the same index positions is x3; when P is 4, after division, the maximum of the number of the incorrect CBs at the same index positions is x4; and if x3 is minimum, P is determined to be 3.

Furthermore, when multiple values of the number P of the CB sets meet one of the conditions, the number P of the CB sets in the feedback information set is a maximum value in the values meeting the condition.

Alternatively, the feedback information set further includes at least one CB set division manner.

Alternatively, the feedback information set further includes the number Z of the correct or incorrect CB sets, in which Z is a positive integer and $1 \leq Z \leq P$.

Alternatively, the feedback information set further includes the CB error patterns of the incorrect CB sets, or the CB error pattern of the TB.

Alternatively, the step that the first transmission node determines the at least one kind of feedback information in the preset feedback information set according to the states of the P CB sets includes that:

when the P CB sets are all correct CB sets, the first transmission node determines the correctness indication information ACK in the preset feedback information set as the feedback information (that is, the correctness indication information Ack is sent to the second transmission node);

furthermore, that the P CB sets are all correct CB sets is equal to one of the following conditions: the TB is a correct TB, or the K CBs are all correct CBs; and when at least one CB set in the P CB sets is an incorrect CB set and the feedback information set includes one kind of incorrectness indication information NACK, the first transmission node determines the incorrectness indication information NACK in the preset feedback information set as the feedback information (that is, the incorrectness indication information NACK in the feedback information set is sent to the second transmission node).

Of course, the other information in the preset feedback information set may further be determined as the feedback information together.

Alternatively, the step that the first transmission node determines the at least one kind of feedback information in the preset feedback information set according to the state of the P CB sets includes that: when the feedback information set at least includes the incorrectness indication information $NACK_1$ and $NACK_2$, the first transmission node determines the incorrectness indication information in the preset feedback information set as the feedback information (namely: sent to the second transmission node) according to the number of the incorrect (or correct) CB sets in the P CB sets or according to the incorrectness rate (or correctness rate) of the CB sets. Specifically:

when the number of the incorrect CB sets (or the incorrectness rate of the CB sets) does not exceed a second preset threshold value, or when the number of the correct CB sets (or the correctness rate of the CB sets) exceeds a third preset threshold value, the first transmission node determines the incorrectness indication information $NACK_1$ in the preset feedback information set as the feedback information (that is, the incorrectness indication information $NACK_1$ is sent to the second transmission node); and when the number of the incorrect CB sets (or the incorrectness rate of the CB sets) exceeds the second preset threshold value, or when the number of the correct CB sets (or the correctness rate of the CB sets) does not exceed the third preset threshold value, the first transmission node determines the incorrectness indication information $NACK_2$ in the preset feedback information set as the feedback information (that is, the incorrectness indication information $NACK_2$ is sent to the second transmission node).

Of course, the other information in the preset feedback information set may further be determined as the feedback information together.

Alternatively, the step that the first transmission node determines the at least one kind of feedback information in the preset feedback information set according to the state of the P CB sets includes that: when the feedback information set at least includes the incorrectness indication information $NACK_1$ and $NACK_2$, the first transmission node determines the incorrectness indication information in the preset feedback information set as the feedback information (namely: sent to the second transmission node) according to the CB error patterns of the incorrect CB sets. Specifically:

when a number of the incorrect CBs at the same index positions in the incorrect CB sets does not exceed a fourth preset threshold value, the first transmission node determines the incorrectness indication information $NACK_1$ in the preset feedback information set as the feedback information (that is, the first incorrectness indication information $NACK_1$ is sent to the second transmission node); and when the number of the incorrect CBs at the same index positions in the incorrect CB sets exceeds the fourth preset threshold value, the first transmission node determines the incorrectness indication information $NACK_2$ in the preset feedback information set as the feedback information (that is, the second incorrectness indication information $NACK_2$ is sent to the second transmission node).

Of course, the other information in the preset feedback information set may further be determined as the feedback information together.

A feedback device is arranged in a first transmission node, and includes:

a receiving component, arranged to receive a signal including a TB from a second transmission node, wherein the TB includes K CBs and the K CBs are divided into P CB sets, wherein K and P are positive integers, $K \geq 3$ and $2 \leq P \leq K$;

a state determination component, arranged to obtain states of the P CB sets according to the signal including the TB;

a feedback information determination component, arranged to determine at least one kind of feedback information in a preset feedback information set according to the state of the P CB sets, in which the feedback information set at least includes correctness indication information (ACK) and n kinds of incorrectness indication information ($NACK_1$, $NACK_2$, ..., $NACK_n$), n is an integer more than or equal to 1; and a sending component, arranged to send the determined feedback information to the second transmission node.

Alternatively, the first transmission node may be, but not limited to: any network element with data receiving and signaling sending functions such as a terminal, an evolved Node B and a relay.

Alternatively, the second transmission node may be, but not limited to: any network element with a signaling receiving function such as a terminal, an evolved Node B and a relay.

Alternatively, each CB set in the P CB sets includes at least one CB in the TB.

Alternatively, each CB set in the P CB sets may be determined according to at least one preset CB set division manner and a number P of the CB sets.

Furthermore, the preset CB set division manner at least includes a continuous division manner or a discontinuous division manner.

Furthermore, the continuous division manner refers to that at least two CBs at adjacent positions in the TB are divided into the same CB set.

Furthermore, the discontinuous division manner refers to that CBs at any two adjacent positions in the TB may not be divided into the same CB set in the P CB sets.

Alternatively, the number P of the CB sets may be configured by the evolved Node B.

Furthermore, the number P of the CB sets may be one of m preset positive integers, and is sent to a terminal by the evolved Node B through signaling, and $m \geq 1$.

Alternatively, the number P of the CB sets may be autonomously determined by the first transmission node and sent from the first transmission node to the second transmission node.

Alternatively, the number P of the CB sets may also be determined according to a size of the TB.

Furthermore, specifically, the size of the TB is divided into multiple value intervals according to a sequence from small to large, and each value interval corresponds to a number P of the CB sets; and the number of the CB sets is determined according to a value interval of the size of the TB.

Alternatively, a number of CBs in each CB set may be determined according to the following method:

when K may be exactly divided by P, each CB set includes K/P CBs; and when K may not be exactly divided by P, each CB set in $P_1 = K - P \cdot \lfloor K/P \rfloor$ CB sets includes $\lceil K/P \rceil$ CBs, and each CB set in $P_2 = P \cdot \lceil K/P \rceil - K$ CB sets includes $\lfloor K/P \rfloor$ original CBs and a filling CB, in which operators $\lceil x \rceil$ and $\lfloor x \rfloor$ respectively represent a rounding-up or rounding-down operation over x, and $P_1 + P_2 = P$.

Furthermore, the filling CB may be formed by any preset data, including, but not limited to: a CB formed by an all-1 bit sequence or an all-0 bit sequence, or any CB in the CB set.

Alternatively, the device may further include a CB set division element, arranged to divide the K CBs of the TB into the P CB sets according to the CB set division manner and the number P of the CB sets.

Alternatively, the operation that the state determination component obtains the state of the P CB sets according to the signal including the TB refers to that:

the state determination component determines the states of the P CB sets according to at least one of the following parameters: a number of incorrect (or correct) CB sets in the P CB sets, an incorrectness rate (or correctness rate) of the CB sets, CB error patterns of the incorrect CB sets in the P CB sets and a CB error pattern of the TB.

Furthermore, the correct CB sets refer to that each of the CB sets includes correct CBs.

Furthermore, the incorrect CB sets refer to that each of the CB sets includes at least one incorrect CB.

Furthermore, the incorrectness rate (or correctness rate) of the CB sets refers to dividing the number of the incorrect (or correct) CB sets in the P CB sets by P.

Furthermore, the CB error patterns of the incorrect CB sets refer to positions (indexes) of incorrect (or correct) CBs in the incorrect CB sets.

Furthermore, the CB error pattern of the TB refers to positions (indexes) of incorrect (or correct) CBs in the TB.

Alternatively, when the feedback information set includes correctness indication information ACK and one kind of incorrectness indication information NACK, the correctness indication information ACK is used for indicating that the first transmission node correctly receives the TB.

Alternatively, when the feedback information set includes the correctness indication information ACK and the unique incorrectness indication information NACK, the unique incorrectness indication information NACK is used for indicating that the first transmission node does not correctly receive the TB.

Alternatively, when the feedback information set includes the correctness indication information ACK and the unique incorrectness indication information NACK, the ACK is represented by a bit "0" and the NACK is represented by a bit "1"; or, the ACK is represented by the bit "1" and the "NACK" is represented by the bit "0".

Alternatively, when the feedback information set at least includes the correctness indication information ACK and two kinds of incorrectness indication information $NACK_1$ and $NACK_2$, the correctness indication information ACK is used for indicating that the first transmission node correctly receives the TB.

Alternatively, when the feedback information set at least includes the correctness indication information ACK and the two kinds of incorrectness indication information $NACK_1$ and $NACK_2$, the incorrectness indication information $NACK_1$ is used for indicating that retransmitted data at least includes part of data obtained by packet coding on M CB sets in the P CB sets, in which M is a positive integer and $2 \leq M \leq P$.

Furthermore, that the retransmitted data at least includes part of data obtained by packet coding between the M CB sets in the P CB sets refers to that:

the second transmission node performs packet coding on the M CB sets in the P CB sets to obtain S check CB sets, in which a length of each check CB set is T bits, M, S and T are all positive integers and $2 \leq M \leq P$; and the retransmitted data at least includes Q bits in each check CB set, in which Q is a positive integer and $1 \leq Q \leq T$.

Furthermore, packet coding refers to that bits or symbols at the same index positions in the M CB sets are coded to generate the S check CB sets.

Furthermore, a coding operation may be, but not limited to, one of the following manners: bit exclusive or (or called as modular two additions) coding, Reed-Solomon coding, BCH coding, linear coding such as digital fountain coding, symbol superimposition coding, network coding and the like.

Alternatively, when the feedback information set at least includes the correctness indication information ACK and the two kinds of incorrectness indication information $NACK_1$ and $NACK_2$, the incorrectness indication information $NACK_2$ is used for indicating that the retransmitted data should at least include part of data of the TB.

Alternatively, when the feedback information set at least includes the incorrectness indication information ACK and the two kinds of incorrectness indication information $NACK_1$ and $NACK_2$, the ACK, the $NACK_1$ and the $NACK_2$ are respectively represented by any two bits.

Alternatively, when the feedback information set at least includes the incorrectness indication information ACK and the two kinds of incorrectness indication information $NACK_1$ and $NACK_2$, the ACK, the $NACK_1$ and the $NACK_2$ are modulated by adopting a nonuniform constellation diagram. That is, on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

Alternatively, the feedback information set further includes the number P of the CB sets.

Furthermore, the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$;

or, the number P of the CB sets meets that: after the K CBs are divided into the P sets, the maximum of the number of the incorrect CBs at the same index positions is minimum in division solutions when P adopts different values. For example, when P is 2, after division, the maximum of the number of the incorrect CBs at the same index positions is x2; when P is 3, after division, the maximum of the number of the incorrect CBs at the same index positions is x3; when P is 4, after division, the maximum of the number of the incorrect CBs at the same index positions is x4; and when x3 is minimum, P is determined to be 3.

Furthermore, when multiple values of the number P of the CB sets meet one of the conditions, the number P of the CB sets in the feedback information set is a maximum value in the values meeting the condition.

Alternatively, the feedback information set further includes at least one CB set division manner.

Alternatively, the feedback information set further includes the number Z of the correct or incorrect CB sets, in which Z is a positive integer and $1 \leq Z \leq P$.

Alternatively, the feedback information set further includes the CB error patterns of the incorrect CB sets, or the CB error pattern of the TB.

Alternatively, the operation that the feedback information determination component determines the at least one kind of feedback information in the preset feedback information set according to the state of the P CB sets refers to that:

when the P CB sets are all correct CB sets, the feedback information determination component determines the correctness indication information (ACK) in the preset feedback information set as the feedback information;

furthermore, that the P CB sets are all correct CB sets is equal to one of the following conditions: the TB is a correct TB, or the K CBs are all correct CBs; and when at least one CB set in the P CB sets is an incorrect CB set and the feedback information set includes one kind of incorrectness indication information NACK, the incorrectness indication information NACK in the preset feedback information set is determined as the feedback information.

Of course, the other information in the preset feedback information set may further be determined as the feedback information together.

Alternatively, the operation that the feedback information determination component determines the at least one kind of feedback information in the preset feedback information set according to the state of the P CB sets refers to that:

when the feedback information set at least includes the incorrectness indication information $NACK_1$ and $NACK_2$, the feedback information determination component determines the incorrectness indication information in the preset feedback information set as the feedback information according to the number of the incorrect (or correct) CB sets in the P CB sets or according to the incorrectness rate (or correctness rate) of the CB sets. Specifically:

when the number of the incorrect CB sets (or the incorrectness rate of the CB sets) does not exceed a second preset threshold value, or when the number of the correct CB sets (or the correctness rate of the CB sets) exceeds a third preset threshold value, the incorrectness indication information $NACK_1$ in the preset feedback information set is determined as the feedback information; and when the number of the incorrect CB sets (or the incorrectness rate of the CB sets) exceeds the second preset threshold value, or when the number of the correct CB sets (or the correctness rate of the CB sets) does not exceed the third preset threshold value, the incorrectness indication information $NACK_2$ in the preset feedback information set is determined as the feedback information.

Of course, the other information in the preset feedback information set may further be determined as the feedback information together.

Alternatively, the operation that the feedback information determination component determines the at least one kind of feedback information in the preset feedback information set according to the state of the P CB sets refers to that:

when the feedback information set at least includes the incorrectness indication information $NACK_1$ and $NACK_2$, the feedback information determination component determines the incorrectness indication information in the preset feedback information set as the feedback information according to the CB error patterns of the incorrect CB sets. Specifically:

when a number of the incorrect CBs at the same index positions in the incorrect CB sets does not exceed a fourth preset threshold value, the first incorrectness indication information $NACK_1$ in the preset feedback information set is determined as the feedback information; and when the number of the incorrect CBs at the same index positions in the incorrect CB sets exceeds the fourth preset threshold value, the second incorrectness indication information $NACK_2$ in the preset feedback information set is determined as the feedback information.

Of course, the other information in the preset feedback information set may further be determined as the feedback information together.

Embodiment 1 (Method Embodiment)

Figure 3:
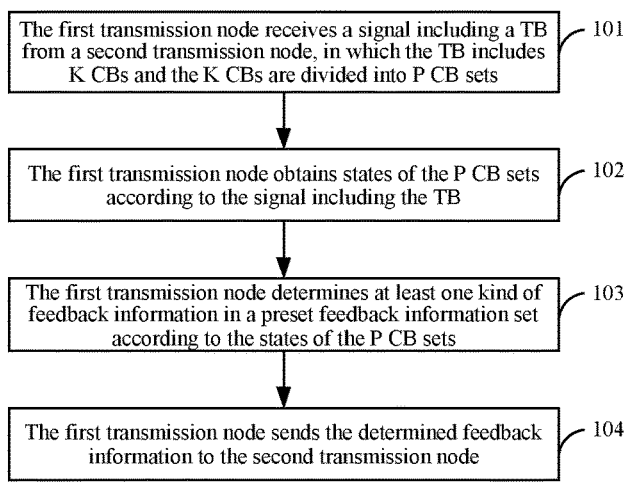
FIG. 3 is a flowchart of a method according to a first example embodiment.

The embodiment discloses a feedback method, which is applied to a first transmission node. As shown in FIG. 3, the method includes the following steps.

Step 101: the first transmission node receives a signal including a TB from a second transmission node, in which the TB includes K CBs and the K CBs are divided into P CB sets, and K and P are positive integers, $K \geq 3$ and $2 \leq P \leq K$.

Step 102: the first transmission node obtains states of the P CB sets according to the signal including the TB.

Step 103: the first transmission node determines at least one kind of feedback information in a preset feedback information set according to the states of the P CB sets.

Step 104: the first transmission node sends the determined feedback information to the second transmission node, in which the feedback information set at least includes correctness indication information (ACK) and n kinds of incorrectness indication information ($NACK_1$, $NACK_2$, ..., $NACK_n$), n is an integer more than or equal to 1.

Alternatively, the first transmission node may be, but not limited to: any network element with data receiving and signaling sending functions such as a terminal, an evolved Node B and a relay.

Alternatively, the second transmission node may be, but not limited to: any network element with a signaling receiving function such as a terminal, an evolved Node B and a relay.

Alternatively, each CB set in the P CB sets includes at least one CB in the TB.

Alternatively, each CB set in the P CB sets may be determined according to at least one preset CB set division manner and a number P of the CB sets.

Furthermore, the preset CB set division manner at least includes a continuous division manner or a discontinuous division manner.

Furthermore, the continuous division manner refers to that at least two CBs at adjacent positions in the TB are divided into the same CB set.

Furthermore, the discontinuous division manner refers to that CBs at any two adjacent positions in the TB may not be divided into the same CB set in the P CB sets.

Alternatively, the number P of the CB sets may be configured by the evolved Node B.

Furthermore, the number P of the CB sets is one of m preset positive integers, and is determined by the first transmission node and sent from the first transmission node to the second transmission node, and $m \geq 1$.

Alternatively, the number P of the CB sets may be autonomously determined by the first transmission node and sent from the first transmission node to the second transmission node.

Alternatively, the number P of the CB sets may also be determined according to a size of the TB.

Furthermore, specifically, the size of the TB is divided into multiple value intervals according to a sequence from small to large, and each value interval corresponds to the number P of the CB sets; and the number of the CB sets is determined according to a value interval of the size of the TB.

Alternatively, a number of CBs in each CB set may be determined according to the following method:

when K may be exactly divided by P, each CB set includes K/P CBs; and when K may not be exactly divided by P, each CB set in $P_1 = K - P \cdot \lfloor K/P \rfloor$ CB sets includes $\lceil K/P \rceil$ CBs, and each CB set in $P_2 = P \cdot \lceil K/P \rceil - K$ CB sets includes $\lfloor K/P \rfloor$ original CBs and a filling CB, in which operators $\lceil x \rceil$ and $\lfloor x \rfloor$ respectively represent a rounding-up or rounding-down operation over x, and $P_1 + P_2 = P$.

Here, a filling CB may be formed by any preset bit sequence, including, but not limited to, one of the following manners:

a first manner: a CB formed by an all-1 bit sequence or an all-0 bit sequence; and a second manner: a CB in the K original CBs.

Alternatively, the state of the P CB sets may be determined according to at least one of the following parameters: a number of incorrect (or correct) CB sets in the P CB sets, an incorrectness rate (or correctness rate) of the CB sets, CB error patterns of the incorrect CB sets in the P CB sets and a CB error pattern of the TB.

Furthermore, the correct CB sets refer to that each of CB sets includes correct CBs.

Furthermore, the incorrect CB sets refer to that each of the CB sets includes at least one incorrect CB.

Furthermore, the incorrectness rate (or correctness rate) of the CB sets refers to dividing the number of the incorrect (or correct) CB sets in the P CB sets by P.

Furthermore, the CB error patterns of the incorrect CB sets refer to positions (indexes) of incorrect (or correct) CBs in the incorrect CB sets.

Furthermore, the CB error pattern of the TB refers to positions (indexes) of incorrect (or correct) CBs in the TB.

Alternatively, when the feedback information set includes correctness indication information ACK and one kind of incorrectness indication information NACK, the correctness indication information ACK is used for indicating that the first transmission node correctly receives the TB.

Alternatively, when the feedback information set includes the correctness indication information ACK and the unique incorrectness indication information NACK, the unique incorrectness indication information NACK is used for indicating that the first transmission node does not correctly receive the TB.

Alternatively, when the feedback information set includes the correctness indication information ACK and the one kind of the incorrectness indication information NACK, the ACK is represented by a bit "0" and the NACK is represented by a bit "1"; or, the ACK is represented by the bit "1" and the "NACK" is represented by the bit "0".

Alternatively, when the feedback information set at least includes the correctness indication information ACK and two kinds of incorrectness indication information $NACK_1$ and $NACK_2$, the correctness indication information ACK is used for indicating that the first transmission node correctly receives the TB.

Alternatively, when the feedback information set at least includes the correctness indication information ACK and the two kinds of incorrectness indication information $NACK_1$ and $NACK_2$, the incorrectness indication information $NACK_1$ is used for indicating that retransmitted data at least includes part of data obtained by packet coding on M CB sets in the P CB sets, in which M is a positive integer and $2 \leq M \leq P$.

Furthermore, the second transmission node performs packet coding on the M CB sets in the P CB sets to obtain S check CB sets, in which a length of each check CB set in the S check CB sets is T bits, M, S and T are all positive integers and $2 \leq M \leq P$; and furthermore, the retransmitted data at least includes Q bits in each check CB set, in which Q is a positive integer and $1 \leq Q \leq T$.

Furthermore, packet coding refers to that bits or symbols at the same index position of each CB set in the M CB sets are coded to generate the S check CB sets.

Furthermore, a coding operation may be, but not limited to, one of the following manners: bit exclusive or (or called as modular two additions) coding, Reed-Solomon coding, BCH coding, linear coding such as digital fountain coding, symbol superimposition coding, network coding and the like.

Alternatively, when the feedback information set at least includes the correctness indication information ACK and the two kinds of incorrectness indication information $NACK_1$ and $NACK_2$, the incorrectness indication information $NACK_2$ is used for indicating that the retransmitted data should at least include part of data of the TB.

Alternatively, when the feedback information set at least includes the incorrectness indication information ACK and the two kinds of incorrectness indication information $NACK_1$ and $NACK_2$, the ACK, the $NACK_1$ and the $NACK_2$ are respectively represented by any two bits.

Alternatively, when the feedback information set at least includes the incorrectness indication information ACK and the two kinds of incorrectness indication information $NACK_1$ and $NACK_2$, the ACK, the $NACK_1$ and the $NACK_2$ are modulated by adopting a nonuniform constellation diagram. That is, on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

Alternatively, the feedback information set further includes the number P of the CB sets.

Furthermore, the number P of the CB sets meets one of the following conditions: after the K CBs are divided into the P CB sets, a maximum of a number of incorrect CBs at the same index positions does not exceed a first preset threshold value G, in which G is a positive integer and $1 \leq G \leq P$;

or, the number P of the CB sets meets that: after the K CBs are divided into the P sets, the maximum of the number of the incorrect CBs at the same index positions is minimum in division solutions when P adopts different values.

Furthermore, when multiple values of the number P of the CB sets meet one of the conditions, the number P of the CB sets in the feedback information set is a maximum value in the values meeting the condition.

Alternatively, the feedback information set further includes at least one CB set division manner.

Alternatively, the feedback information set further includes the number Z of the correct or incorrect CB sets, in which Z is a positive integer and $1 \leq Z \leq P$.

Alternatively, the feedback information set further includes the CB error patterns of the incorrect CB sets, or the CB error pattern of the TB.

Example 1

In the example, the first transmission node is a terminal, and the second transmission node is an evolved Node B.

Figure 4:
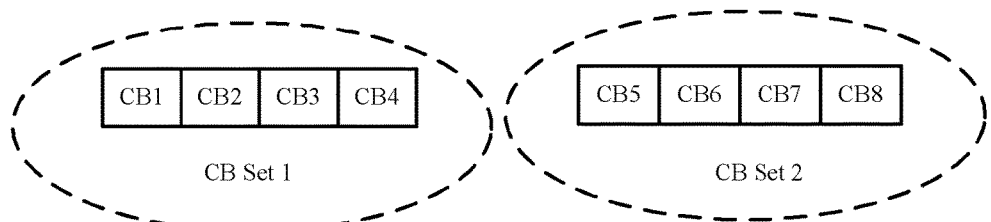
FIG. 4 is a schematic diagram of CB set division according to a first example.

Step A1: the terminal receives a signal including a TB from the evolved Node B, in which the TB includes K=8 CBs and the 8 CBs are divided into P=2 CB sets. As shown in FIG. 4, the CB set 1 includes CBs CB1, CB2, CB3 and CB4, and the CB set 2 includes CBs CB5, CB6, CB7 and CB8. In this example, a continuous division manner is adopted for the CB sets, in which a number P=2 of the CB sets is configured by the evolved Node B, and the evolved Node B selects P=2 from a preset group of numerical values {2, 3, 4, 5}, and sends P=2 to the terminal through downlink signaling.

Step A2: the terminal determines at least one kind of feedback information in a feedback information set according to states of the 2 CB sets, and sends the feedback information to the evolved Node B, in which the feedback information set includes incorrectness indication information (ACK), incorrectness indication information $NACK_1$ and incorrectness indication information $NACK_2$.

In the example, it is supposed that the CB set 1 is incorrectly received and the CB set 2 is correctly received, that is, at least one CB in the CB set 1 is incorrectly received while all the CBs in the CB set 2 are correctly received.

Figure 5:
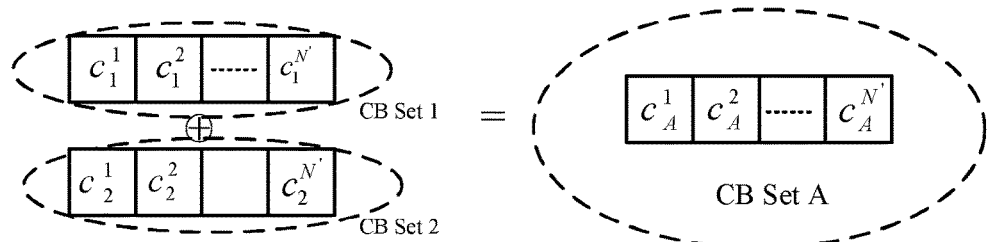
FIG. 5 is a schematic diagram of packet coding of CB sets according to a first example.

In the example, the states of the CB sets is a number of correct or incorrect CB sets, or a function of an incorrectness rate of the CB sets, and at this moment, the number of the correct CB sets is not smaller than a preset threshold value 1, or the number of the incorrect CB sets is not larger than the preset threshold value 1, or a correctness rate of the CB sets is not lower than a preset threshold value 0.5, or the incorrectness rate of the CB sets is not higher than the preset threshold value 0.5. Under such a condition, the terminal may recovery incorrect CBs (or CB sets) with a relatively higher probability by virtue of data obtained by packet coding in retransmitted data sent by the evolved Node B. Therefore, the terminal determines to feed back the incorrectness indication information $NACK_1$ to the evolved Node B. The $NACK_1$ may be represented by two bits. The incorrectness indication information $NACK_1$ is used for indicating that the retransmitted data sent to the terminal by the evolved Node B should include part of data obtained by packet coding of the CB set 1 and the CB set 2. As shown in FIG. 5, a CB set A is obtained by packet coding of the CB set 1 and the CB set 2. The information $NACK_1$ is used for indicating that the retransmitted data should include Q bits in the CB A.

Example 2

A difference between this example and example 1 is that: in the example, the number P of the CB set is determined according to a size of the TB. In the example, the size of the TB belongs to a preset value interval, and a number, corresponding to the value interval, of the CB sets is P=2. At this moment, the number P of the CB sets is not required to be sent between the evolved Node B and the terminal through the signaling.

The other difference between this example and example 1 is that: both the CB set 1 and the CB set 2 are incorrectly received, and at this moment, the number of the correct CB sets is smaller than the preset threshold value 1, or the number of the incorrect CB sets is larger than the preset threshold value 1, or the correctness rate of the CB sets is lower than the preset threshold value 0.5, or the incorrectness rate of the CB sets is higher than the preset threshold value 0.5. Under such a condition, when the retransmitted data only includes the data obtained by packet coding, the terminal may recover the incorrect CBs (or CB sets) only with a relatively lower probability, and when the retransmitted data includes part of data of the TB, the probability of the terminal in recovery of the incorrect CBs (or CB sets) may be increased. Therefore, the terminal determines to feed back the incorrectness indication information $NACK_2$ to the evolved Node B. The incorrectness indication information $NACK_2$ is used for indicating that the retransmitted data should at least include part of data of the TB. That is, the retransmitted data should at least include Q bits in the CB set 1 or the CB set 2.

Example 3

Figure 6:
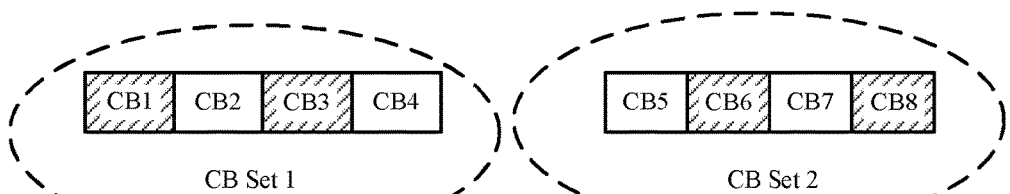
FIG. 6 is a schematic diagram of CB error patterns of CB sets according to a third example.

A difference between this example and example 2 is that: in the example, the receiving state of the CB sets is determined according to CB error patterns the incorrect CB sets. It is supposed that the CB error patterns of the CB 1 and the CB set 2 in the example are shown in FIG. 6.

Moreover, incorrectly received CBs in the CB set 1 and the CB set 2 are represented by shaded areas, the CB error pattern of the CB set 1 may be represented by a vector err1=[1,0,1,0], and the CB error pattern of the CB set 2 may be represented by a vector err2=[0,1,0,1], in which the elements 1 represent positions of the incorrect CBs in the CB sets. It can be seen that a number of the incorrect CBs at any same position in the CB set 1 and the CB set 2 does not exceed 1. Under such a condition, the terminal may recover the incorrect CBs (or CB sets) with a relatively higher probability by virtue of the data obtained by packet coding in the retransmitted data sent by the evolved Node B. Therefore, the terminal determines to feed back the incorrectness indication information $NACK_1$ to the second transmission node.

Example 4

Figure 7:
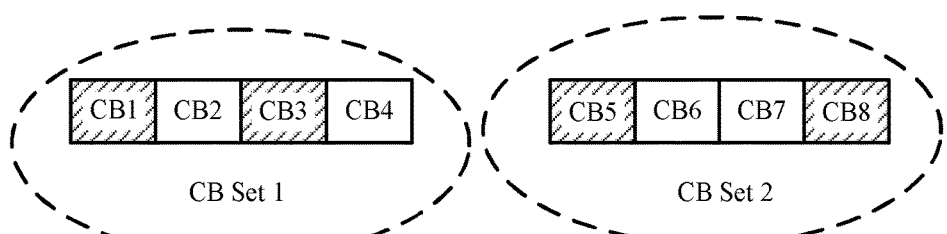
FIG. 7 is a schematic diagram of CB error patterns of CB sets according to a fourth example.

A difference between this example and example 3 is that: in the example, the CB error patterns of the CB set 1 and the CB set 2 are shown in FIG. 7.

Moreover, the incorrectly received CBs in the CB set 1 and the CB set 2 are represented by shaded areas, the CB error pattern of the CB set 1 may be represented by the vector err1=[1,0,1,0], and the CB error pattern of the CB set 2 may be represented by the vector err2[1,0,0,1], in which the elements 1 represent the positions of the incorrect CBs in the CB sets. It can be seen that first CBs in the CB set 1 and the CB set 2 are both incorrectly received, that is, a number of the incorrect CBs at a position exceeds 1. Under such a condition, when the retransmitted data only includes the data obtained by packet coding, the terminal may recover the incorrect CBs (or CB sets) only with a relatively lower probability, and when the retransmitted data includes part of data of the TB, the probability of the terminal in recovery of the incorrect CBs (or CB sets) may be increased. Therefore, the terminal determines to feed back the second incorrectness indication information $NACK_2$ to the second transmission node. The second incorrectness indication information $NACK_2$ is used for indicating that the retransmitted data should at least include part of data of the TB. That is, the retransmitted data should at least include Q bits in the CB set 1 or the CB set 2.

Example 5

Figure 8:
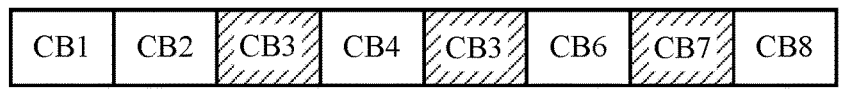
FIG. 8 is a schematic diagram of a CB error pattern of a TB according to a fifth example.

A difference between this example and example 3 and example 4 is that: in the example, the CB error patterns are different, and in the example, the feedback information set further includes the number P of the CB sets. In the example, the states of the CB sets are determined according to the CB error patterns of the incorrect CB sets, and it is supposed that a CB error pattern of the TB is shown in FIG. 8.

Figure 9:
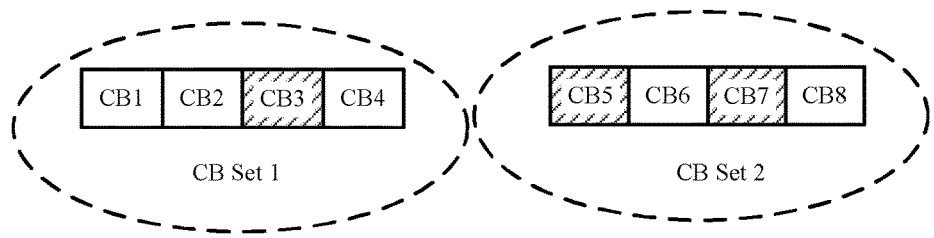
FIG. 9 is a schematic diagram of CB error patterns of CB sets (when P=2) according to a fifth example.

When the 8 CBs are divided into 2 CB sets, as shown in FIG. 9, the CB error patterns of the CB sets may be represented by err1=[0,0,1,0] and err2=[1,0,1,0] respectively. At this moment, third CBs in the CB set 1 and the CB set 2 are both incorrect CBs, that is, the number of the incorrect CBs at the same index position exceeds the threshold value 1.

Figure 10:
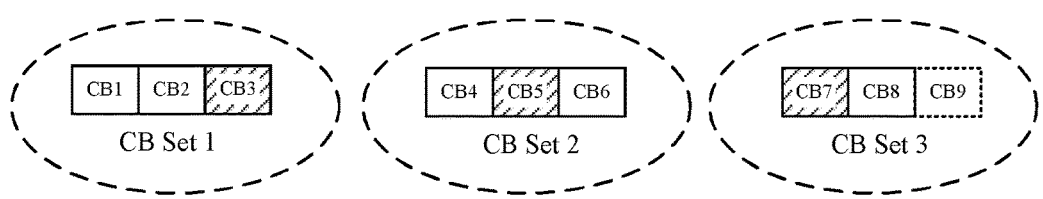
FIG. 10 is a schematic diagram of CB error patterns of CB sets (when P=2) according to a fifth example.

When the 8 CBs are divided into 3 CB sets, because the number of the CBs may not be exactly divided by the number of the CB sets, it is necessary to add a filling CB into the CB set 3 according to the CB set division manner of the example, and as shown in FIG. 10, the CB 9 is the filling CB.

CB error patterns of the CB sets may be respectively represented by err1=[0,0,1], err2=[0,1,0] and err3=[1,0,0]. It can be seen that the number of incorrect CBs at any same position in the CB set 1, the CB set 2 and the CB set 3 does not exceed 1.

At this moment, the information fed back to the evolved Node B by the terminal includes the number P=3 of the CB sets.

Example 6

A difference between this example and example 3 and example 4 is that: in the example, the states of the CB sets are determined according to the CB error pattern of the TB, and the feedback information set further includes the CB error pattern of the TB.

In the example, the CB error pattern of the TB may be represented by err=[0,0,1,0,1,0,1,0].

At this moment, the information fed back to the evolved Node B by the terminal includes the CB error pattern of the TB.

Example 7

A difference between this example and example 1 to example 6 is that the feedback information sent to the evolved Node B by the terminal is modulated by adopting a nonuniform constellation diagram. That is, on the modulation constellation diagram, a Euclidean distance between the ACK and the $NACK_1$ is longer than a Euclidean distance between the $NACK_1$ and the $NACK_2$, and a Euclidean distance between the ACK and the $NACK_2$ is also longer than the Euclidean distance between the $NACK_1$ and the $NACK_2$.

Figure 11:
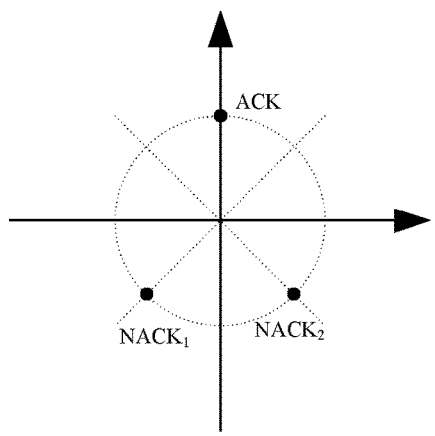
FIG. 11 is a diagram of a nonuniform modulation constellation for ACK, $NACK_1$ and $NACK_2$ according to a seventh example.

Specifically, the ACK, the $NACK_1$ and the $NACK_2$ sent to the evolved Node B by the terminal are modulated by a constellation diagram shown in FIG. 11.

Example 8

A difference between this example and example 1 to example 7 is that the feedback information set in the example includes the incorrectness indication information ACK and incorrectness indication information NACK. At this moment, the feedback information sent to the evolved Node B by the terminal includes the NACK, and the NACK is used for indicating that the terminal does not correctly receive the TB.

Example 9

A difference between this example and the example 5 is that: in the example, the feedback information set further includes the CB set division manner. In the CB sets, the continuous division manner is indicated by a bit "0", and the discontinuous division manner is indicated by a bit "1".

In the embodiment, the CB set division manner is determined according to the terminal, so that the information fed back to the evolved Node B by the terminal further includes the CB set indication manner indicated by the bit "0".

Embodiment 2 (Device Embodiment)

The embodiment discloses a feedback device, which is applied to a first transmission node and includes:

a receiving component, arranged to receive a signal including a TB from a second transmission node, wherein the TB includes K CBs and the K CBs are divided into P CB sets, wherein K and P are positive integers, K≥3 and 2≤P≤K;

a state determination component, arranged to obtain states of the P CB sets according to the signal including the TB;

a feedback information determination component, arranged to determine at least one kind of feedback information in a preset feedback information set according to the state of the P CB sets, in which the feedback information set at least includes correctness indication information (ACK) and n kinds of incorrectness indication information ($NACK_1$, $NACK_2$, ..., $NACK_n$), n is an integer more than or equal to 1; and a sending component, arranged to send the determined feedback information to the second transmission node.

Alternatively, the first transmission node may be, but not limited to: any network element with data receiving and signaling sending functions such as a terminal, an evolved Node B and a relay.

Alternatively, the second transmission node may be, but not limited to: any network element with a signaling receiving function such as a terminal, an evolved Node B and a relay.

Alternatively, each CB set in the P CB sets includes at least one CB in the TB.

Alternatively, each CB set in the P CB sets may be determined according to at least one preset CB set division manner and a number P of the CB sets.

Furthermore, the preset CB set division manner at least includes a continuous division manner or a discontinuous division manner.

Furthermore, the continuous division manner refers to that at least two CBs at adjacent positions in the TB are divided into the same CB set.

Furthermore, the discontinuous division manner refers to that CBs at any two adjacent positions in the TB may not be divided into the same CB set in the P CB sets.

Alternatively, the number P of the CB sets may be configured by the evolved Node B.

Furthermore, the number P of the CB sets may be one of m preset positive integers, and is sent to a terminal by the evolved Node B through signaling, and m≥1.

Alternatively, the number P of the CB sets may be autonomously determined by the first transmission node and sent from the first transmission node to the second transmission node.

Alternatively, the number P of the CB sets may also be determined according to a size of the TB.

Furthermore, specifically, the size of the TB is divided into multiple value intervals according to a sequence from small to large, and each value interval corresponds to a number P of the CB sets; and the number of the CB sets is determined according to a value interval of the size of the TB.

Alternatively, a number of CBs in each CB set may be determined according to the following method:

when K may be exactly divided by P, each CB set includes K/P CBs; and when K may not be exactly divided by P, each CB set in $P_1=K-P\cdot\lfloor K/P \rfloor$ CB sets includes $\lceil K/P \rceil$ CBs, and each CB set in $P_2=P\cdot\lceil K/P \rceil-K$ CB sets includes $\lfloor K/P \rfloor$ original CBs and a filling CB, in which operators $\lceil x \rceil$ and $\lfloor x \rfloor$ respectively represent a rounding-up or rounding-down operation over x, and $P_1+P_2=P$.

Here, the filling CB may be formed by any preset bit sequence, including, but not limited to, one of the following manners:

a first manner: a CB formed by an all-1 bit sequence or an all-0 bit sequence; and a second manner: any CB in the K original CBs.

Alternatively, the device may further include a CB set division element, arranged to divide the K CBs of the TB into the P CB sets according to the CB set division manner and the number P of the CB sets.

Alternatively, the state of the P CB sets is determined according to at least one of the following parameters: a number of incorrect (or correct) CB sets in the P CB sets, an incorrectness rate (or correctness rate) of the CB sets, CB error patterns of the incorrect CB sets in the P CB sets and a CB error pattern of the TB.

Furthermore, the correct CB sets refer to that each CB sets includes correct CBs.

Furthermore, the incorrect CB sets refer to that each of the CB sets includes at least one incorrect CB.

Furthermore, the incorrectness rate (or correctness rate) of the CB sets refers to dividing the number of the incorrect (or correct) CB sets in the P CB sets by P.

Furthermore, the CB error patterns of the incorrect CB sets refer to positions (indexes) of incorrect (or correct) CBs in the incorrect CB sets.

Furthermore, the CB error pattern of the TB refers to positions (indexes) of incorrect (or correct) CBs in the TB.

Alternatively, when the feedback information set includes correctness indication information ACK and one kind of incorrectness indication information NACK, the correctness indication information ACK is used for indicating that the first transmission node correctly receives the TB.

Alternatively, when the feedback information set includes the correctness indication information ACK and the unique incorrectness indication information NACK, the unique incorrectness indication information NACK is used for indicating that the first transmission node does not correctly receive the TB.

Alternatively, when the feedback information set includes the correctness indication information ACK and the unique incorrectness indication information NACK, the ACK is represented by a bit "0" and the NACK is represented by a bit "1"; or, the ACK is represented by the bit "1" and the "NACK" is represented by the bit "0".

Alternatively, when the feedback information set at least includes the correctness indication information ACK and two kinds of incorrectness indication information $NACK_1$ and $NACK_2$, the correctness indication information ACK is used for indicating that the first transmission node correctly receives the TB.

Alternatively, when the feedback information set at least includes the correctness indication information ACK and the two kinds of incorrectness indication information $NACK_1$ and $NACK_2$, the incorrectness indication information $NACK_1$ is used for indicating that retransmitted data at least includes part of data obtained by packet coding on M CB sets in the P CB sets, in which M is a positive integer and $2 \leq M \leq P$.

Furthermore, the second transmission node performs packet coding on the M CB sets in the P CB sets to obtain S check CB sets, in which a length of each check CB set is T bits, M, S and T are all positive integers and $2 \leq M \leq P$; and the retransmitted data at least includes Q bits in each check CB set, in which Q is a positive integer and $1 \leq Q \leq T$.

Furthermore, packet coding refers to that bits or symbols at the same index positions in the M CB sets are coded to generate the S check CB sets.

Furthermore, a coding operation may be, but not limited to, one of the following manners: bit exclusive or (or called as modular two additions) coding, Reed-Solomon coding, BCH coding, linear coding such as digital fountain coding, symbol superimposition coding, network coding and the like.

Alternatively, when the feedback information set at least includes the correctness indication information ACK and the two kinds of incorrectness indication information $NACK_1$ and $NACK_2$, the incorrectness indication information $NACK_2$ is used for indicating that the retransmitted data should at least include part of data of the TB.

Alternatively, when the feedback information set at least includes the incorrectness indication information ACK and the two kinds of incorrectness indication information $NACK_1$ and $NACK_2$, the ACK, the $NACK_1$ and the $NACK_2$ are respectively represented by any two bits.

Alternatively, when the feedback information set at least includes the incorrectness indication information ACK and the two kinds of incorrectness indication information $NACK_1$ and $NACK_2$, the ACK, the $NACK_1$ and the $NACK_2$ are modulated by adopting a nonuniform constellation diagram. That is, on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

Alternatively, the feedback information set further includes the number P of the CB sets.

Furthermore, the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$;

or, the number P of the CB sets meets that: after the K CBs are divided into the P sets, the maximum of the number of the incorrect CBs at the same index positions is minimum in division solutions when P adopts different values.

Furthermore, when multiple values of the number P of the CB sets meet one of the conditions, the number P of the CB sets in the feedback information set is a maximum value in the values meeting the condition.

Alternatively, the feedback information set further includes the CB set division manner.

Alternatively, the feedback information set further includes the number Z of the correct or incorrect CB sets, in which Z is a positive integer and $1 \leq Z \leq P$.

Alternatively, the feedback information set further includes the CB error patterns of the incorrect CB sets, or the CB error pattern of the TB.

Alternatively, when the P CB sets are all correct CB sets, the first transmission node sends the correctness indication information ACK to the second transmission node.

Furthermore, that the P CB sets are all correct CB sets is equal to one of the following conditions: the TB is a correct TB, or the K CBs are all correct CBs.

Alternatively, when at least one CB set in the P CB sets is an incorrect CB set and the feedback information set includes one kind of incorrectness indication information NACK, the first transmission node sends the incorrectness indication information NACK in the preset feedback information set to the second transmission node.

Alternatively, when the feedback information set at least includes the incorrectness indication information $NACK_1$ and $NACK_2$, the first transmission node determines the incorrectness indication information sent to the second transmission node according to the number of the incorrect (or correct) CB sets in the P CB sets or according to the incorrectness rate (or correctness rate) of the CB sets.

Furthermore, when the number of the incorrect CB sets (or the incorrectness rate of the CB sets) does not exceed a preset threshold value, or when the number of the correct CB sets (or the correctness rate of the CB sets) exceeds a preset threshold value, the first transmission node sends the incorrectness indication information $NACK_1$ to the second transmission node.

Furthermore, when the number of the incorrect CB sets (or the incorrectness rate of the CB sets) exceeds the preset threshold value, or when the number of the correct CB sets (or the correctness rate of the CB sets) does not exceed the preset threshold value, the first transmission node sends the incorrectness indication information $NACK_2$ to the second transmission node.

Alternatively, when the feedback information set at least includes the incorrectness indication information $NACK_1$ and $NACK_2$, the first transmission node determines the incorrectness indication information sent to the second transmission node according to the CB error patterns of the incorrect CB sets.

Furthermore, when a number of the incorrect CBs at the same index positions in the incorrect CB sets does not exceed a preset threshold value, the first transmission node sends the first incorrectness indication information $NACK_1$ to the second transmission node.

Furthermore, when the number of the incorrect CBs at the same index positions in the incorrect CB sets exceeds the preset threshold value, the first transmission node sends the second incorrectness indication information $NACK_2$ to the second transmission node.

Example 1

Figure 12:
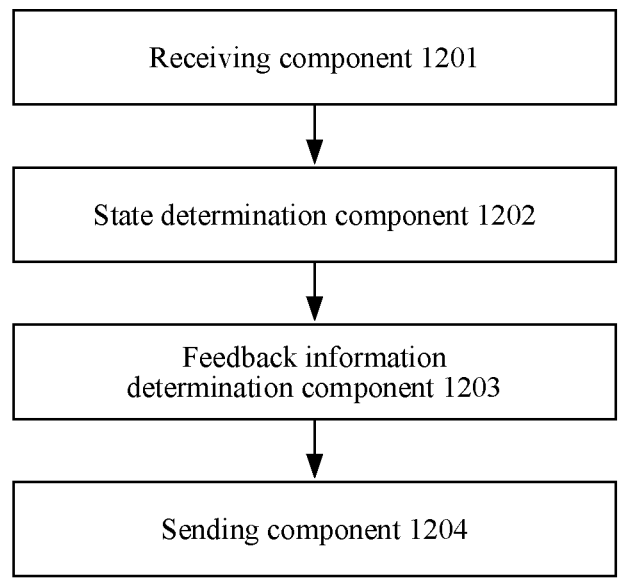
FIG. 12 is a schematic block diagram of a first example according to a second example embodiment.

In the example, the first transmission node is a terminal, and the second transmission node is an evolved Node B. The terminal or a device arranged in the terminal includes a receiving component 1201, a state determination component 1202, a feedback information determination component 1203 and a sending component 1204, as shown in FIG. 12.

The receiving component 1201 of the terminal is arranged to receive a signal including a TB from the evolved Node B, wherein the TB is formed by K=8 CBs, and is formed by P=2 CB sets. As shown in FIG. 4, a continuous division manner is adopted for the CB sets, wherein a number P=2 of the CB sets is configured by the evolved Node B, and the evolved Node B selects P=2 from a preset group of numerical values {2, 3, 4, 5}, and sends it to the terminal through downlink signaling.

The feedback information determination component 1203 of the terminal determines at least one kind of feedback information in a feedback information set according to states of the 2 CB sets, and sends the feedback information to the evolved Node B through the sending component 1204, in which the feedback information set includes incorrectness indication information ACK, incorrectness indication information $NACK_1$ and incorrectness indication information $NACK_2$.

In the example, it is supposed that the CB set 1 is incorrectly received and the CB set 2 is correctly received, that is, at least one CB in the CB set 1 is incorrectly received while all the CBs in the CB set 2 are correctly received.

In the example, the states of the CB sets is a number of correct or incorrect CB sets, or a function of an incorrectness rate of the CB sets, and at this moment, the number of the correct CB sets is not smaller than a preset threshold value 1, or the number of the incorrect CB sets is not larger than the preset threshold value 1, or a correctness rate of the CB sets is not lower than a preset threshold value 0.5, or the incorrectness rate of the CB sets is not higher than the preset threshold value 0.5. Under such a condition, the terminal may recovery incorrect CBs (or CB sets) with a relatively higher probability by virtue of data obtained by packet coding in retransmitted data sent by the evolved Node B. Therefore, the terminal determines to feed back the incorrectness indication information $NACK_1$ to the evolved Node B. The $NACK_1$ may be represented by two bits. The incorrectness indication information $NACK_1$ is used for indicating that the retransmitted data sent to the terminal by the evolved Node B should include part of data obtained by packet coding of the CB set 1 and the CB set 2. As shown in FIG. 5, a CB set A is obtained by packet coding of the CB set 1 and the CB set 2. The information $NACK_1$ is used for indicating that the retransmitted data should include Q bits in the CB A.

Example 2

A difference between this example and example 1 is that: in the example, the number P of the CB set is determined according to a size of the TB. In the example, the size of the TB belongs to a preset value interval, and a number, corresponding to the value interval, of the CB sets is P=2. At this moment, the number P of the CB sets is not required to be sent between the evolved Node B and the terminal through the signaling.

The other difference between this example and example 1 is that: both the CB set 1 and the CB set 2 are incorrectly received in the receiving component 1201, and at this moment, the number of the correct CB sets is smaller than the preset threshold value 1, or the number of the incorrect CB sets is larger than the preset threshold value 1, or the correctness rate of the CB sets is lower than the preset threshold value 0.5, or the incorrectness rate of the CB sets is higher than the preset threshold value 0.5. Under such a condition, when the retransmitted data only includes the data obtained by packet coding, the terminal may recover the incorrect CBs (or CB sets) only with a relatively lower probability, and when the retransmitted data includes part of data of the TB, the probability of the terminal in recovery of the incorrect CBs (or CB sets) may be increased. Therefore, the terminal determines to feed back the incorrectness indication information $NACK_2$ to the evolved Node B. The incorrectness indication information $NACK_2$ is used for indicating that the retransmitted data should at least include part of data of the TB. That is, the retransmitted data should at least include Q bits in the CB set 1 or the CB set 2.

Example 3

A difference between this example and example 2 is that: in the example, the receiving state of the CB sets is determined according to CB error patterns the incorrect CB sets. It is supposed that the CB error patterns of the CB 1 and the CB set 2 in the example are shown in FIG. 6.

Moreover, incorrectly received CBs in the CB set 1 and the CB set 2 are represented by shaded areas, the CB error pattern of the CB set 1 may be represented by a vector err1=[1,0,1,0], and the CB error pattern of the CB set 2 may be represented by a vector err2=[0,1,0,1], in which the elements 1 represent positions of the incorrect CBs in the CB sets. It can be seen that a number of the incorrect CBs at any same position in the CB set 1 and the CB set 2 does not exceed 1. Under such a condition, the terminal may recover the incorrect CBs (or CB sets) with a relatively higher probability by virtue of the data obtained by packet coding in the retransmitted data sent by the evolved Node B. Therefore, the terminal determines to feed back the incorrectness indication information $NACK_1$ to the second transmission node.

Example 4

A difference between this example and example 3 is that: in the example, the CB error patterns of the CB set 1 and the CB set 2 are shown in FIG. 7.

Moreover, the incorrectly received CBs in the CB set 1 and the CB set 2 are represented by shaded areas, the CB error pattern of the CB set 1 may be represented by the vector err1=[1,0,1,0], and the CB error pattern of the CB set 2 may be represented by the vector err2[1,0,0,1], in which the elements 1 represent the positions of the incorrect CBs in the CB sets. It can be seen that first CBs in the CB set 1 and the CB set 2 are both incorrectly received, that is, a number of the incorrect CBs at a position exceeds 1. Under such a condition, when the retransmitted data only includes the data obtained by packet coding, the terminal may recover the incorrect CBs (or CB sets) only with a relatively lower probability, and when the retransmitted data includes part of data of the TB, the probability of the terminal in recovery of the incorrect CBs (or CB sets) may be increased. Therefore, the terminal determines to feed back the second incorrectness indication information $NACK_2$ to the second transmission node. The second incorrectness indication information $NACK_2$ is used for indicating that the retransmitted data should at least include part of data of the TB. That is, the retransmitted data should at least include Q bits in the CB set 1 or the CB set 2.

Example 5

A difference between this example and example 3 and example 4 is that: in the example, the CB error patterns are different, and in the example, the feedback information set further includes the number P of the CB sets. In the example, the states of the CB sets are determined according to the CB error patterns of the incorrect CB sets, and it is supposed that a CB error pattern of the TB is shown in FIG. 8.

When the 8 CBs are divided into 2 CB sets, as shown in FIG. 9, the CB error patterns of the CB sets may be represented by err1=[0,0,1,0] and err2=[1,0,1,0] respectively. At this moment, third CBs in the CB set 1 and the CB set 2 are both incorrect CBs, that is, the number of the incorrect CBs at the same index position exceeds the threshold value 1.

When the 8 CBs are divided into 3 CB sets, because the number of the CBs may not be exactly divided by the number of the CB sets, it is necessary to add a filling CB into the CB set 3 according to the CB set division manner of the example, and as shown in FIG. 10, the CB 9 is the filling CB.

CB error patterns of the CB sets may be respectively represented by err1=[0,0,1], err2=[0,1,0] and err3=[1,0,0]. It can be seen that the number of incorrect CBs at any same position in the CB set 1, the CB set 2 and the CB set 3 does not exceed 1.

At this moment, the information fed back to the evolved Node B by the terminal includes the number P=3 of the CB sets.

Example 6

A difference between this example and example 3 and example 4 is that: in the example, the state of the CB sets is determined according to the CB error pattern of the TB, and the feedback information set further includes the CB error pattern of the TB.

In the example, the CB error pattern of the TB may be represented by err=[0,0,1,0,1,0,1,0].

At this moment, the information fed back to the evolved Node B by the terminal includes the CB error pattern of the TB.

Example 7

A difference between this example and example 1 to example 6 is that the feedback information sent to the evolved Node B by the terminal is further modulated by adopting a nonuniform constellation diagram. That is, on the modulation constellation diagram, a Euclidean distance between the ACK and the $NACK_1$ is longer than a Euclidean distance between the $NACK_1$ and the $NACK_2$, and a Euclidean distance between the ACK and the $NACK_2$ is also longer than the Euclidean distance between the $NACK_1$ and the $NACK_2$.

Specifically, the ACK, the $NACK_1$ and the $NACK_2$ sent to the evolved Node B by the terminal are modulated by a constellation diagram shown in FIG. 11.

Example 8

A difference between this example and example 1 to example 7 is that the feedback information set in the example includes the incorrectness indication information ACK and incorrectness indication information NACK. At this moment, the feedback information sent to the evolved Node B by the terminal includes the NACK, and the NACK is used for indicating that the terminal does not correctly receive the TB.

Example 9

A difference between this example and the example 5 is that: in the example, the feedback information set further includes the CB set division manner. In the CB sets, the continuous division manner is indicated by a bit "0", and the discontinuous division manner is indicated by a bit "1".

In the embodiment, the CB set division manner is determined according to the terminal, so that the information fed back to the evolved Node B by the terminal further includes the CB set indication manner indicated by the bit "0".

Example 10

Figure 13:
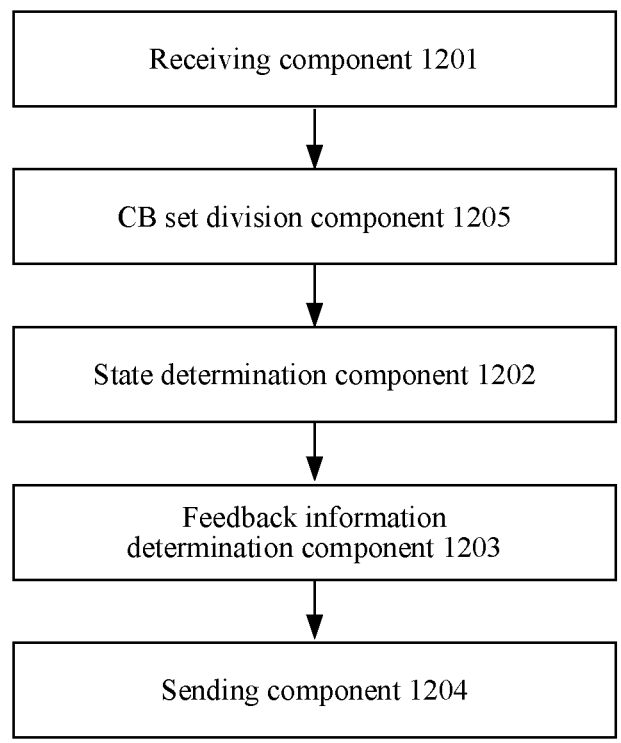
FIG. 13 is a schematic block diagram of a tenth example according to a second example embodiment.

A difference between this example and example 1 to example 9 is that: in the example, the terminal further includes a CB set division component 1205, arranged to divide the K CBs of the TB into the P CB sets, as shown in FIG. 13.

Moreover, the CB set division component 1205 divides the K CBs into the P CB sets according to the CB set division manner (the continuous division manner or the discontinuous division manner) and the number of the CB sets.

Furthermore, the continuous division manner refers to that at least two CBs at adjacent positions in the TB are divided into the same CB set.

The discontinuous division manner refers to that CBs at any two adjacent positions in the TB may not be divided into the same CB set in the P CB sets.

The number P of the CB sets may be one of m preset positive integers, and is sent to the terminal by the evolved Node B through signaling; or, the number P of the CB sets may be autonomously determined by the first transmission node and sent from the first transmission node to the second transmission node; or, the number P of the CB sets may further be determined according to a size of the TB. Specifically, the TB is divided into multiple value intervals according to a sequence from small to large, and each value interval corresponds to a number P of the CB sets.

Those skilled in the art should know that all or part of the steps of the method may be implemented by related hardware instructed by a program, and the program may be stored in a computer-readable storage medium, such as a read-only memory, a magnetic disk or an optical disk. Alternatively, all or part of the steps of the embodiment may also be implemented by one or more integrated circuits. Correspondingly, each component or element in the embodiment may be implemented in form of hardware, and may also be implemented in form of software function component. The disclosure is not limited to any specific hardware and software combination.

Of course, the disclosure may also have many other embodiments, those skilled in the art may make various corresponding variations and transformations according to the disclosure without departing from the spirit and essence of the disclosure, and these corresponding variations and transformations shall fall within the scope of protection of the claims of the disclosure.

INDUSTRIAL APPLICABILITY

According to the technical solutions of the disclosure, a retransmitted data volume may be effectively reduced, and data retransmission efficiency may be improved. Therefore, the disclosure has high industrial practicability.

What is claimed is:

1. A feedback method, applied to a first transmission node, comprising:
   receiving, by the first transmission node, a signal comprising a Transmission Block (TB) from a second transmission node, wherein the TB comprises K Code Blocks (CBs) and the K CBs are divided into P CB sets, K and P are positive integers, K≥3 and 2≤P≤K;
   obtaining, by the first transmission node, states of the P CB sets according to the signal comprising the TB;
   determining, by the first transmission node, at least one kind of feedback information in a preset feedback information set according to the states of the P CB sets, wherein the feedback information set at least comprises: correctness indication information and n kinds of incorrectness indication information, n is an integer more than or equal to 1; and sending, by the first transmission node, the determined feedback information to the second transmission node.

2. The feedback method as claimed in claim 1, wherein each CB set in the P CB sets comprises at least one CB in the TB;

or each CB set in the P CB sets is determined according to at least one preset CB set division manner and a number P of CB sets; the preset CB set division manner at least comprises a continuous division manner or a discontinuous division manner, wherein the continuous division manner refers to that at least two CBs at adjacent positions in the TB are divided into the same CB set; and the discontinuous division manner refers to that CBs at any two adjacent positions in the TB may not be divided into the same CB set in the P CB sets;

or the number P of the CB sets is one of m preset positive integers, and is determined by the first transmission node and sent from the first transmission node to the second transmission node, and $m \geq 1$;

or a number P of CB sets is determined according to a size of the TB.

3. The feedback method as claimed in claim 1, wherein obtaining, by the first transmission node, the states of the P CB sets according to the signal comprising the TB comprises:

determining, by the first transmission node, the states of the P CB sets according to at least one of the following parameters:

a number of incorrect or correct CB sets in the P CB sets, an incorrectness rate or correctness rate of CB sets, CB error patterns of incorrect CB sets in the P CB sets and a CB error pattern of the TB;

the correct CB sets refers to that each of the CB sets comprise correct CBs; the incorrect CB sets refer to that each of CB sets comprises at least one incorrect CB; the incorrectness rate or correctness rate of the CB sets refers to dividing a number of incorrect or correct CB sets in the P CB sets by P; the CB error patterns of the incorrect CB sets refer to positions or indexes of incorrect or correct CBs in the incorrect CB sets; and the CB error pattern of the TB refers to positions or indexes of incorrect or correct CBs in the TB.

4. The feedback method as claimed in claim 1, wherein when the feedback information set comprises correctness indication information Acknowledgement (ACK) and one kind of incorrectness indication information Negative Acknowledgement (NACK), the correctness indication information ACK is used for indicating that the first transmission node correctly receives the TB; and the incorrectness indication information NACK is used for indicating that the first transmission node does not correctly receive the TB.

5. The feedback method as claimed in claim 1, wherein when the feedback information set at least comprises the correctness indication information ACK and two kinds of incorrectness indication information $NACK_1$ and $NACK_2$, the correctness indication information ACK is used for indicating that the first transmission node correctly receives the TB; the incorrectness indication information $NACK_1$ is used for indicating that retransmitted data at least comprises part of data obtained by packet coding on M CB sets in the P CB sets, wherein M is a positive integer and $2 \leq M \leq P$; and the incorrectness indication information $NACK_2$ is used for indicating that the retransmitted data should at least comprise part of data of the TB.

6. The feedback method as claimed in claim 5, wherein after sending, by the first transmission node, the determined feedback information to the second transmission node, further comprising:

performing, by the second transmission node, packet coding on the M CB sets in the P CB sets to obtain S check CB sets, wherein a length of each check CB set in the S check CB sets is T bits, M, S and T are all positive integers and $2 \leq M \leq P$; and the retransmitted data at least comprises Q bits in each check CB set, wherein Q is a positive integer and $1 \leq Q \leq T$.

7. The feedback method as claimed in claim 6, wherein performing, by the second transmission node, the packet coding on the M CB sets in the P CB sets to obtain the S check CB sets comprises:

coding bits or symbols at the same index position of each CB set in the M CB sets to generate the S check CB sets.

8. The feedback method as claimed in claim 1, wherein sending, by the first transmission node, the determined feedback information to the second transmission node comprises:

when the feedback information set at least comprises the incorrectness indication information ACK and the two kinds of incorrectness indication information $NACK_1$ and $NACK_2$, modulating the ACK, the $NACK_1$ and the $NACK_2$ by adopting a nonuniform constellation diagram.

9. The feedback method as claimed in claim 8, wherein modulating the ACK, the $NACK_1$ and the $NACK_2$ by adopting the nonuniform constellation diagram comprises:

on the modulation constellation diagram, determining that a Euclidean distance between the ACK and the $NACK_1$ is longer than a Euclidean distance between the $ACK_1$ and the $NACK_2$ and a Euclidean distance between the ACK and the $NACK_2$ is also longer than the Euclidean distance between the $ACK_1$ and the $NACK_2$.

10. The feedback method as claimed in claim 1, wherein the feedback information set further comprises a number P of CB sets; and the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$; or, after the K CBs are divided into the P CB sets, a maximum of a number of incorrect CBs at the same index positions is minimum in division solutions when P adopts different values;

or the feedback information set further comprises at least one CB set division manner;

or the feedback information set further comprises a number Z of correct or incorrect CB sets, wherein Z is a positive integer and $1 \leq Z \leq P$;

or the feedback information set further comprises CB error patterns of incorrect CB sets, or a CB error pattern of the TB.

11. The feedback method as claimed in claim 1, wherein determining, by the first transmission node, the at least one kind of feedback information in the preset feedback information set according to the states of the P CB sets comprises:

when the P CB sets are all correct CB sets, determining, by the first transmission node, correctness indication information ACK in the preset feedback information set as feedback information, and when at least one CB set in the P CB sets is an incorrect CB set and the feedback information set comprises one kind of incorrectness indication information NACK, determining, by the first transmission node, the incorrectness indication information NACK in the preset feedback information set as the feedback information.

12. The feedback method as claimed in claim 1, wherein determining, by the first transmission node, the at least one kind of feedback information in the preset feedback information set according to the states of the P CB sets comprises:

when the feedback information set at least comprises incorrectness indication information $NACK_1$ and $NACK_2$, determining, by the first transmission node, the incorrectness indication information in the preset feedback information set as feedback information according to a number of incorrect or correct CB sets in the P CB sets or according to incorrectness rate or correctness rate of the CB sets.

13. The feedback method as claimed in claim 12, wherein determining, by the first transmission node, the incorrectness indication information sent to the second transmission node according to the number of the incorrect or correct CB sets in the P CB sets or according to the incorrectness rate or correctness rate of the CB sets comprises:

when the number of the incorrect CB sets or the incorrectness rate of the CB sets does not exceed a second preset threshold value, or when the number of the correct CB sets or the correctness rate of the CB sets exceeds a third preset threshold value, determining, by the first transmission node, the incorrectness indication information $NACK_1$ in the preset feedback information set as the feedback information; and when the number of the incorrect CB sets or the incorrectness rate of the CB sets exceeds the second preset threshold value, or when the number of the correct CB sets or the correctness rate of the CB sets does not exceed the third preset threshold value, determining, by the first transmission node, the incorrectness indication information $NACK_2$ in the preset feedback information set as the feedback information.

14. The feedback method as claimed in claim 1, wherein determining, by the first transmission node, the at least one kind of feedback information in the preset feedback information set according to the states of the P CB sets comprises:

when the feedback information set at least comprises incorrectness indication information $NACK_1$ and $NACK_2$, determining, by the first transmission node, the incorrectness indication information in the preset feedback information set as the feedback information according to CB error patterns of incorrect CB sets.

15. The feedback method as claimed in claim 1, wherein determining, by the first transmission node, the incorrectness indication information sent to the second transmission node according to CB error patterns of incorrect CB sets comprises:

when a number of the incorrect CBs at the same index positions in the incorrect CB sets does not exceed a fourth preset threshold value, sending, by the first transmission node, first incorrectness indication information $NACK_1$ to the second transmission node; and when the number of the incorrect CBs at the same index positions in the incorrect CB sets exceeds the fourth preset threshold value, sending, by the first transmission node, second incorrectness indication information $NACK_2$ to the second transmission node.

16. A feedback device, arranged in a first transmission node having a hardware processor, comprising a receiving component, a state determination component, a feedback information determination component and a sending component, wherein the receiving component is arranged to receive a signal comprising a Transmission Block (TB) from a second transmission node, wherein the TB comprises K Code Blocks (CBs) and the K CBs are divided into P CB sets, K and P are positive integers, K≥3 and 2≤P≤K;

the state determination component is arranged to obtain states of the P CB sets according to the signal comprising the TB;

the feedback information determination component is arranged to determine at least one kind of feedback information in a preset feedback information set according to the states of the P CB sets, wherein the feedback information set at least comprises correctness indication information and n kinds of incorrectness indication information, n is an integer more than or equal to 1; and the sending component is arranged to send the determined feedback information to the second transmission node.

17. The device as claimed in claim 16, wherein each CB set in the P CB sets comprises at least one CB in the TB;

or each CB set in the P CB sets is determined according to at least one preset CB set division manner and a number P of CB sets; the preset CB set division manner at least comprises a continuous division manner or a discontinuous division manner, wherein the continuous division manner refers to that at least two CBs at adjacent positions in the TB are divided into the same CB set; and the discontinuous division manner refers to that CBs at any two adjacent positions in the TB may not be divided into the same CB set in the P CB sets;

or, the number P of the CB sets is one of m preset positive integers, and is determined by the first transmission node and sent from the first transmission node to the second transmission node, and m≥1;

or a number P of CB sets is determined according to a size of the TB;

or the state determination component is arranged to obtain the states of the P CB sets according to the signal comprising the TB according to the following manner: the state determination component is arranged to determine the states of the P CB sets according to at least one of the following parameters: a number of incorrect or correct CB sets in the P CB sets, an incorrectness rate or correctness rate of CB sets, CB error patterns of incorrect CB sets in the P CB sets and a CB error pattern of the TB; the correct CB sets refer to that each of the CB sets comprise correct CBs; the incorrect CB sets refer to that each of CB sets comprises at least one incorrect CB; the incorrectness rate or correctness rate of the CB sets refers to dividing a number of incorrect or correct CB sets in the P CB sets by P; the CB error patterns of the incorrect CB sets refer to positions or indexes of incorrect or correct CBs in the incorrect CB sets; and the CB error pattern of the TB refers to positions or indexes of incorrect or correct CBs in the TB;

or when the feedback information set comprises correctness indication information Acknowledgement (ACK) and one kind of incorrectness indication information Negative Acknowledgement (NACK), the correctness indication information ACK is used for indicating that the first transmission node correctly receives the TB; and the incorrectness indication information NACK is used for indicating that the first transmission node does not correctly receive the TB;

or when the feedback information set at least comprises the correctness indication information ACK and two kinds of incorrectness indication information $NACK_1$ and $NACK_2$, the correctness indication information ACK is used for indicating that the first transmission node correctly receives the TB; the incorrectness indication information $NACK_1$ is used for indicating that retransmitted data at least comprises part of data obtained by packet coding on M CB sets in the P CB sets, wherein M is a positive integer and $2 \leq M \leq P$; and the incorrectness indication information $NACK_2$ is used for indicating that the retransmitted data should at least comprise part of data of the TB;

or when the feedback information set at least comprises the incorrectness indication information ACK and the two kinds of incorrectness indication information $NACK_1$ and $NACK_2$, the ACK, the $NACK_1$ and the $NACK_2$ are modulated by adopting a nonuniform constellation diagram;

or the feedback information set further comprises a number P of CB sets; and the number P of the CB sets meets one of the following conditions: after the K CBs are divided into the P CB sets, a maximum of a number of incorrect CBs at the same index positions does not exceed a first preset threshold value G, wherein G is a positive integer and $1 \leq G \leq P$; or, after the K CBs are divided into the P CB sets, a maximum of a number of incorrect CBs at the same index positions is minimum in division solutions when P adopts different values;

or the feedback information set further comprises at least one CB set division manner;

or the feedback information set further comprises a number Z of correct or incorrect CB sets, wherein Z is a positive integer and $1 \leq Z \leq P$;

or the feedback information set further comprises CB error patterns of incorrect CB sets, or a CB error pattern of the TB;

or the feedback information determination component is arranged to determine the at least one kind of feedback information in the preset feedback information set according to the states of the P CB sets according to the following manner: when the P CB sets are all correct CB sets, the feedback information determination component determines correctness indication information ACK in the preset feedback information set as feedback information, and when at least one CB set in the P CB sets is an incorrect CB set and the feedback information set comprises one kind of incorrectness indication information NACK, the feedback information determination component determines the incorrectness indication information NACK in the preset feedback information set as the feedback information;

or the feedback information determination component is arranged to determine the at least one kind of feedback information in the preset feedback information set according to the states of the P CB sets according to the following manner: when the feedback information set at least comprises the incorrectness indication information $NACK_1$ and $NACK_2$, the feedback information determination component determines the incorrectness indication information in the preset feedback information set as the feedback information according to a number of incorrect or correct CB sets in the P CB sets or according to incorrectness rate or correctness rate of the CB sets;

or the feedback information determination component is arranged to determine the at least one kind of feedback information in the preset feedback information set according to the states of the P CB sets according to the following manner: when the feedback information set at least comprises incorrectness indication information $NACK_1$ and $NACK_2$, the feedback information determination component determines the incorrectness indication information in the preset feedback information set as the feedback information according to CB error patterns of incorrect CB sets.

18. The device as claimed in claim 17, wherein an operation that the ACK, the $NACK_1$ and the $NACK_2$ are modulated by adopting the nonuniform constellation diagram refers to that:

on the modulation constellation diagram, a Euclidean distance between the ACK and the $NACK_1$ is longer than a Euclidean distance between the $ACK_1$ and the $NACK_2$, and a Euclidean distance between the ACK and the $NACK_2$ is also longer than the Euclidean distance between the $ACK_1$ and the $NACK_2$.

19. The device as claimed in claim 17, wherein the feedback information determination component is arranged to determine the incorrectness indication information determined as the feedback information in the preset feedback information set according to the number of the incorrect or correct CB sets in the P CB sets or according to the incorrectness rate or correctness rate of the CB sets according to the following manner:

when the number of the incorrect CB sets or the incorrectness rate of the CB sets does not exceed a second preset threshold value, or when the number of the correct CB sets or the correctness rate of the CB sets exceeds a third preset threshold value, the feedback information determination component determines the incorrectness indication information $NACK_1$ in the preset feedback information set as the feedback information; and when the number of the incorrect CB sets or the incorrectness rate of the CB sets exceeds the second preset threshold value, or when the number of the correct CB sets or the correctness rate of the CB sets does not exceed the third preset threshold value, the feedback information determination component determines the incorrectness indication information $NACK_2$ in the preset feedback information set as the feedback information.

20. The device as claimed in claim 17, wherein the feedback information determination component is arranged to determine the incorrectness indication information in the preset feedback information set as the feedback information according to the CB error patterns of the incorrect CB sets according to the following manner:

when a number of the incorrect CBs at the same index positions in the incorrect CB sets does not exceed a fourth preset threshold value, the feedback information determination component determines first incorrectness indication information $NACK_1$ in the preset feedback information set as the feedback information; and when the number of the incorrect CBs at the same index positions in the incorrect CB sets exceeds the fourth preset threshold value, the feedback information determination component determines second incorrectness indication information $NACK_2$ in the preset feedback information set as the feedback information.

* * * * *